United States Patent
Evers et al.

(10) Patent No.: US 7,798,054 B2
(45) Date of Patent: Sep. 21, 2010

(54) DISPENSING OF A SUBSTANCE

(75) Inventors: Lucas Alphonsus Maria Evers, Zeist (NL); Edouard Sterngold, London (GB)

(73) Assignee: MDS Global Holding Ltd., Gzira (MT)

( * ) Notice: Subject to any disclaimer, the term of this patent is extended or adjusted under 35 U.S.C. 154(b) by 1021 days.

(21) Appl. No.: 10/589,796

(22) PCT Filed: Feb. 11, 2005

(86) PCT No.: PCT/EP2005/001541

§ 371 (c)(1),
(2), (4) Date: Oct. 5, 2006

(87) PCT Pub. No.: WO2005/077811

PCT Pub. Date: Aug. 25, 2005

(65) Prior Publication Data
US 2008/0148948 A1      Jun. 26, 2008

(30) Foreign Application Priority Data

Feb. 18, 2004 (EP) ................................. 04075524
Apr. 21, 2004 (EP) ................................. 04076206

(51) Int. Cl.
*A47J 31/00* (2006.01)
*B67D 1/00* (2006.01)

(52) U.S. Cl. ............... 99/295; 99/289 R; 99/302 R; 99/323.3; 222/95; 222/129.1; 222/541.4

(58) Field of Classification Search ............... 99/295, 99/323.3, 302 R, 289 R; 222/92, 94, 95, 222/103, 107, 129.1, 541.4, 541.2, 541.6

See application file for complete search history.

(56) References Cited

U.S. PATENT DOCUMENTS

| | | | |
|---|---|---|---|
| 3,874,143 A | 4/1975 | Braber et al. | |
| 4,220,259 A | 9/1980 | Lagneaux | |
| 4,759,472 A | 7/1988 | Strenger | |
| 4,890,744 A | 1/1990 | Lane, Jr. et al. | |
| 4,899,911 A | 2/1990 | Rohde et al. | |

(Continued)

FOREIGN PATENT DOCUMENTS

| | | |
|---|---|---|
| AU | 5849599 | 2/2000 |
| AU | 2367001 | 7/2001 |
| CA | 2470054 A1 | 6/2003 |

(Continued)

*Primary Examiner*—Reginald L Alexander
(74) *Attorney, Agent, or Firm*—Hoffmann & Baron, LLP

(57) ABSTRACT

The invention proposes to dispense a substance from a container (1) filled with a single portion of a substance. The container comprises a preformed deformable body, preferably made of sheet material, defining a filling cavity which body has an opening (6) and an integral planar circumferential rim (5) surrounding said opening, which opening is closed by a cover sheet (7) which is sealed to the circumferential rim (5) by means of a circumferential sealing seam (10). The container with the substance is opened by making use of the deformability of the cover sheet (7). A support surface supports the cover sheet (7) except at the position of a recess (10b). The recess (10b) is positioned at least over a part of the circumferential sealing seam. Upon compression of the container body the substance is pressurized and the cover sheet (7) bulges out into the recess (10b) such that the sealing seam (10) is broken at the location where the bulge is formed resulting in the container being open.

33 Claims, 27 Drawing Sheets

U.S. PATENT DOCUMENTS

| | | | |
|---|---|---|---|
| 4,915,261 A | 4/1990 | Strenger et al. | |
| 5,215,221 A | 6/1993 | Dirksing et al. | |
| 5,477,660 A | 12/1995 | Smith et al. | |
| 5,529,224 A | 6/1996 | Chan et al. | |
| 5,842,603 A | 12/1998 | Schroeder et al. | |
| 5,918,767 A * | 7/1999 | McGill | 222/95 |
| 6,105,761 A | 8/2000 | Peuker et al. | |
| 6,820,535 B2 | 11/2004 | Fischer | |
| 7,607,385 B2 * | 10/2009 | Halliday et al. | 99/280 |
| 2002/0000441 A1 | 1/2002 | Redmond | |
| 2002/0048621 A1 * | 4/2002 | Boyd et al. | 426/77 |
| 2004/0112222 A1 * | 6/2004 | Fischer | 99/279 |

FOREIGN PATENT DOCUMENTS

| | | |
|---|---|---|
| DE | 19933118 A1 | 5/2000 |
| DE | 19962436 A1 | 7/2001 |
| DE | 10211593 A1 | 6/2003 |
| EP | 0320262 A1 | 6/1989 |
| EP | 0310306 B1 | 3/1992 |
| EP | 1489042 A1 | 12/2004 |
| SU | 497068 | 12/1975 |
| WO | WO00/09416 A2 | 2/2000 |
| WO | WO01/07325 A1 | 2/2001 |
| WO | WO02/28241 A1 | 4/2002 |
| WO | WO02/078499 A1 | 10/2002 |

* cited by examiner

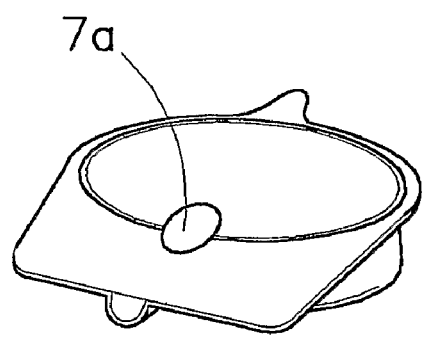
Fig 3
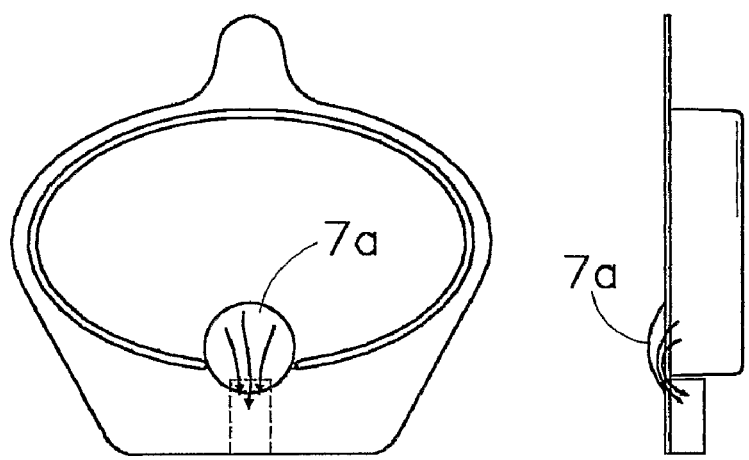 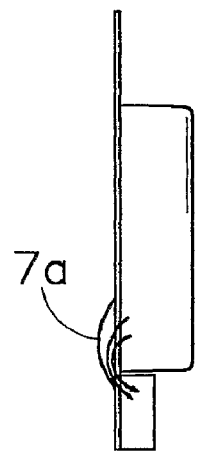
Fig 4b    Fig 4c
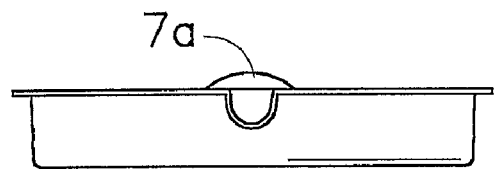
Fig 4a

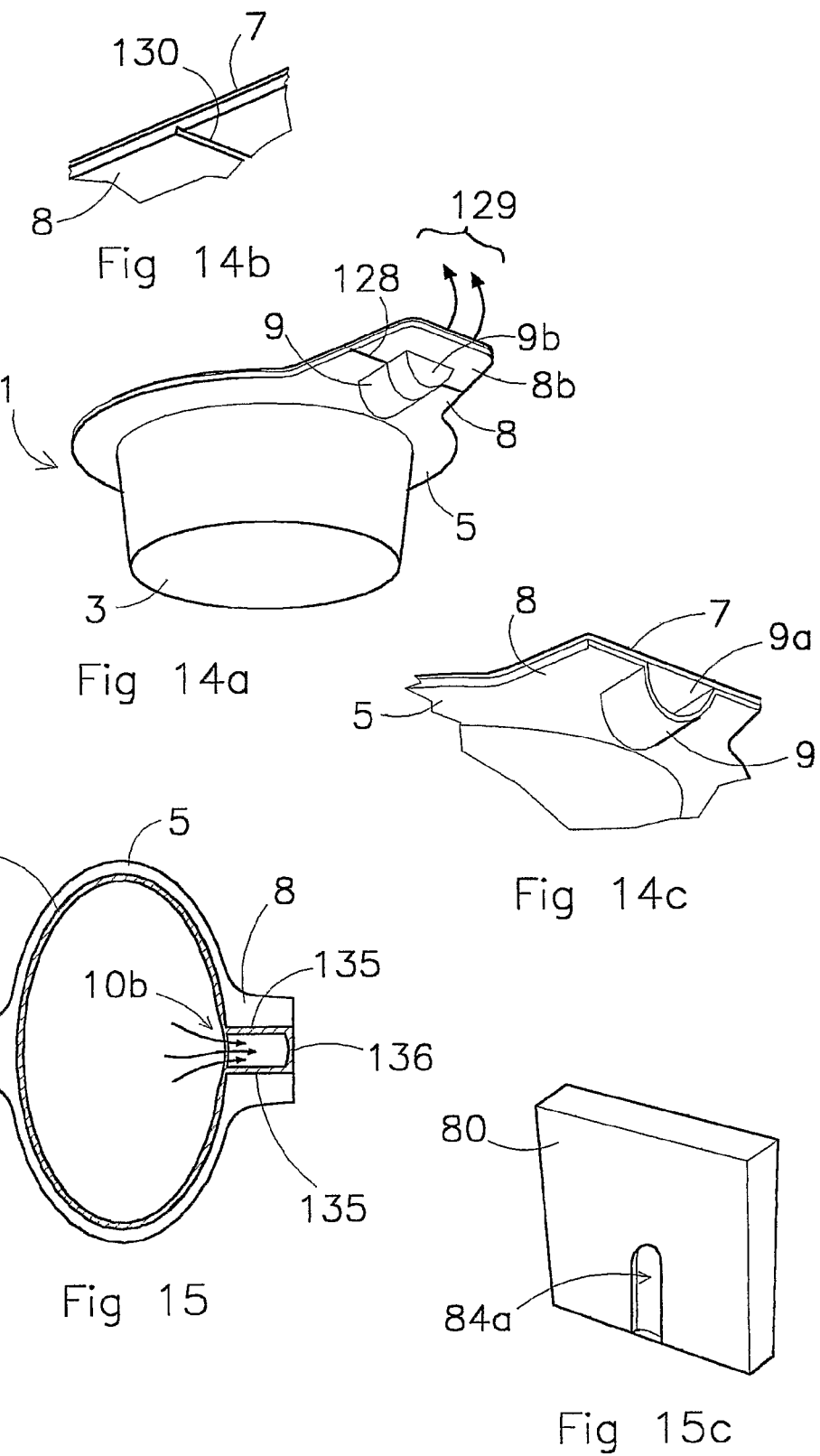

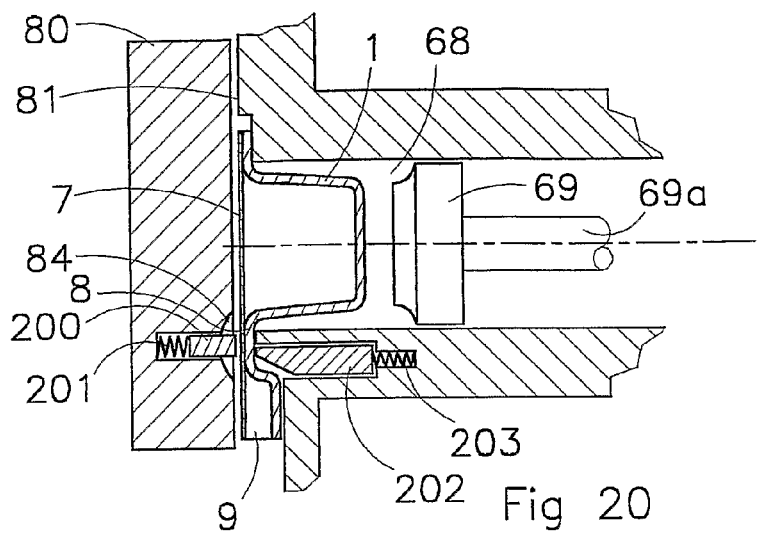
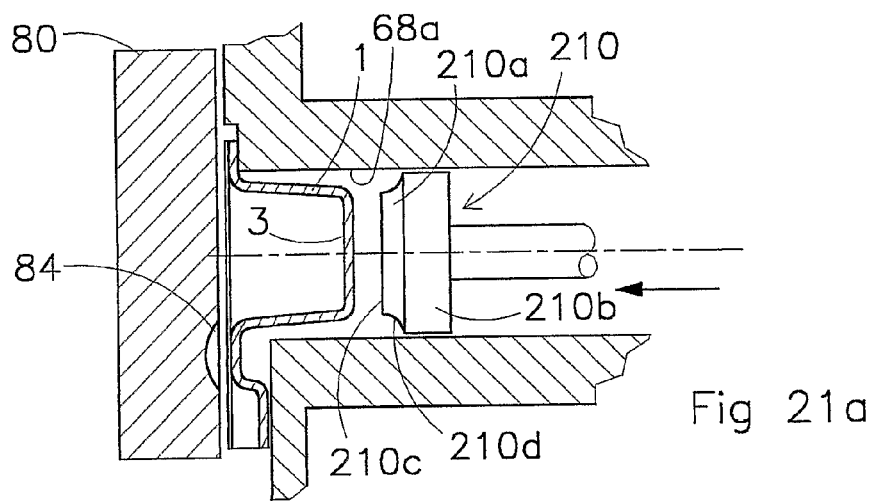
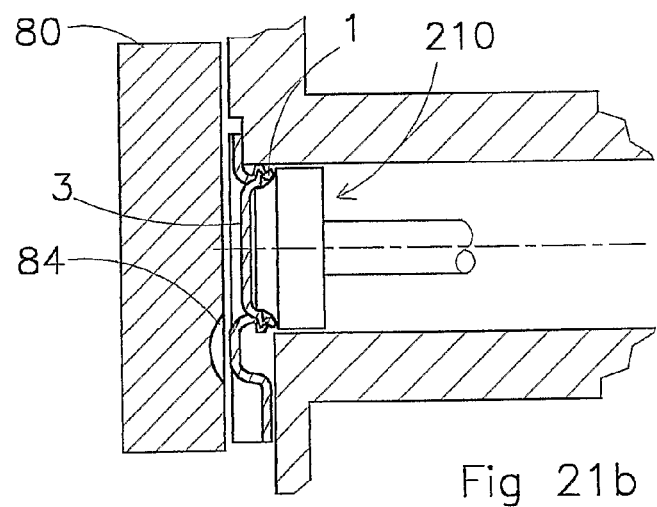

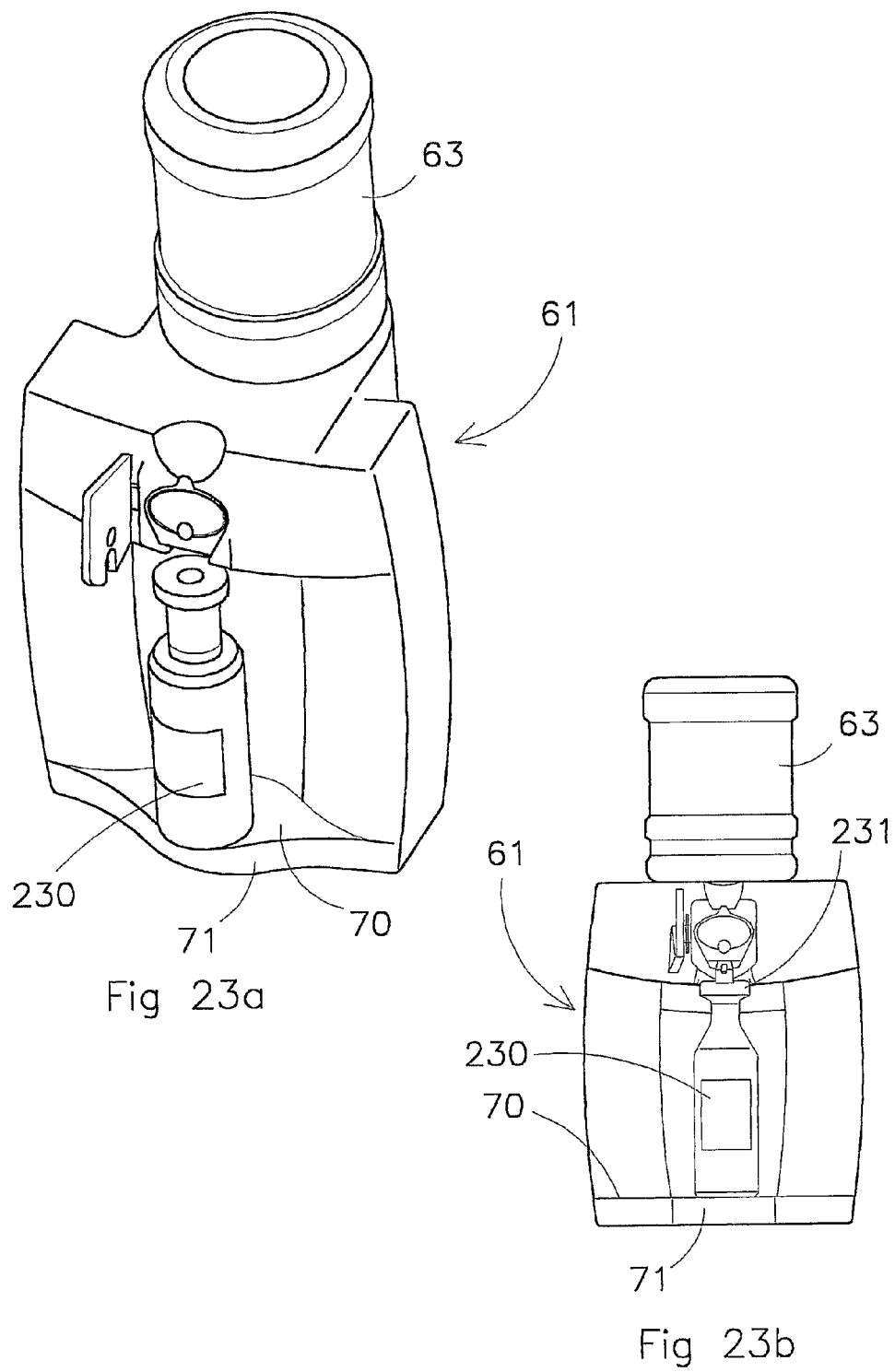

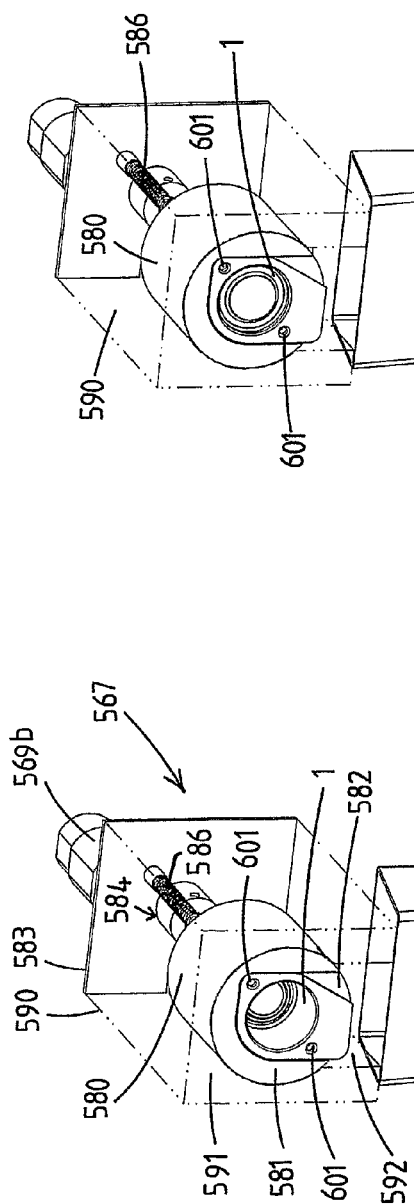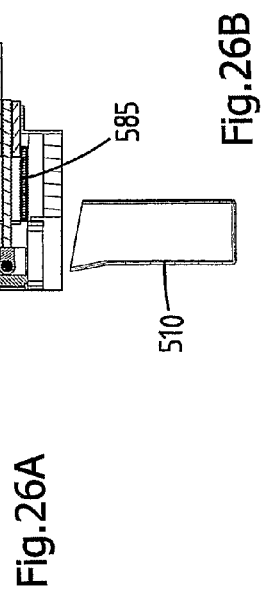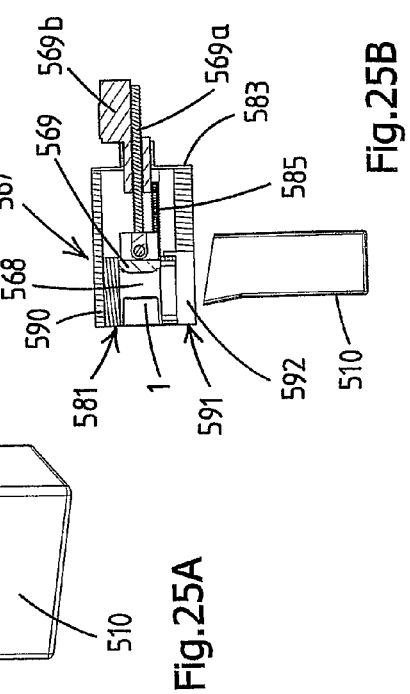
Fig.25A Fig.25B Fig.26A Fig.26B

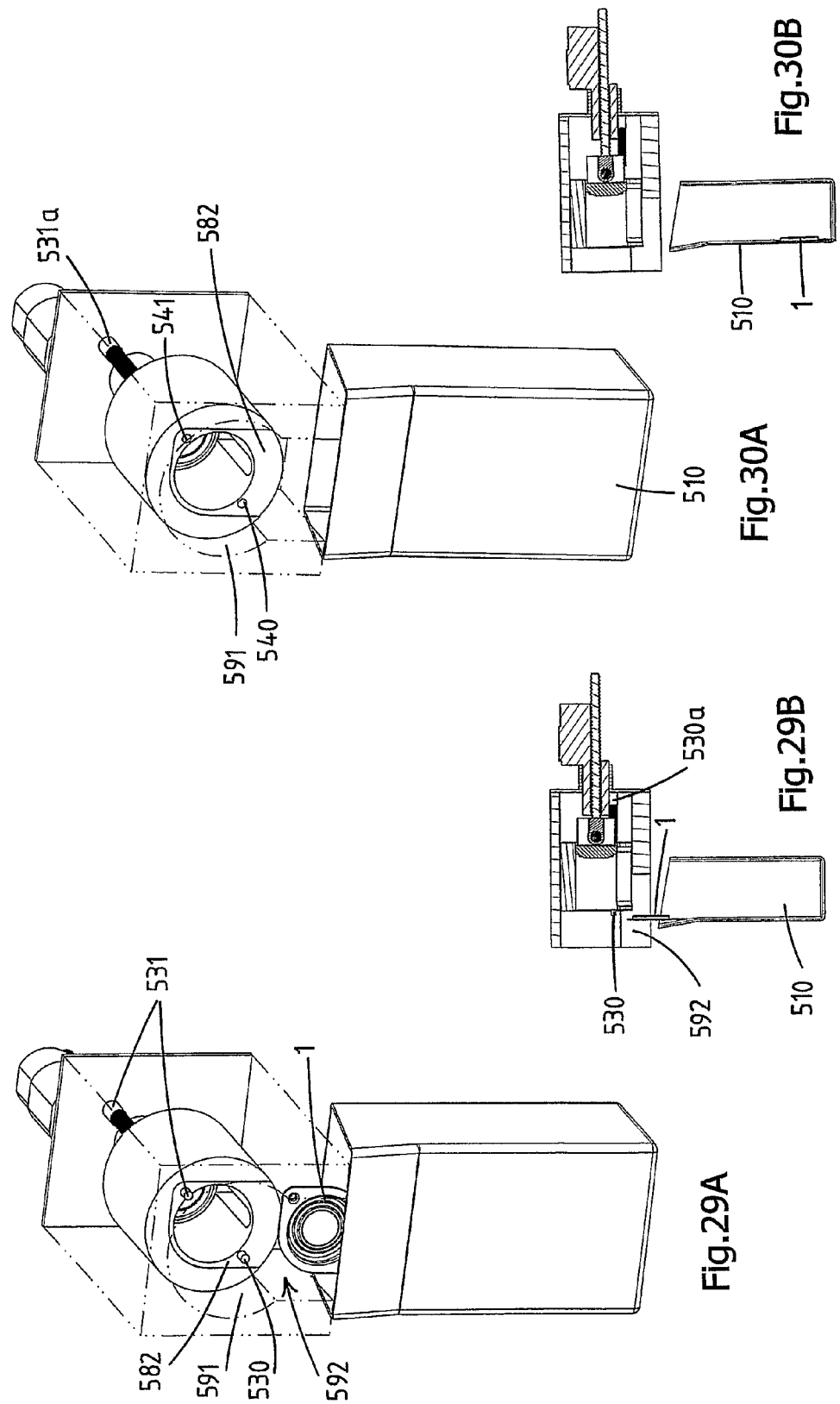

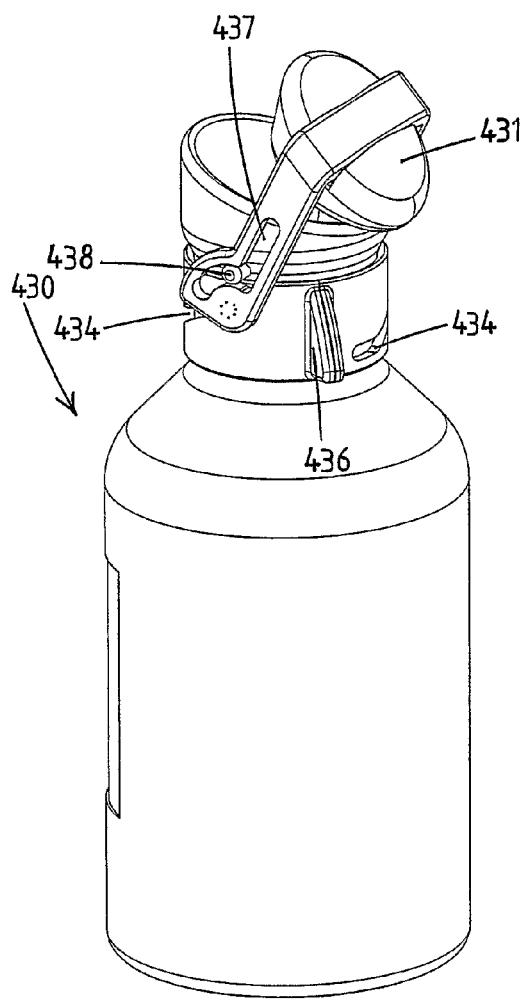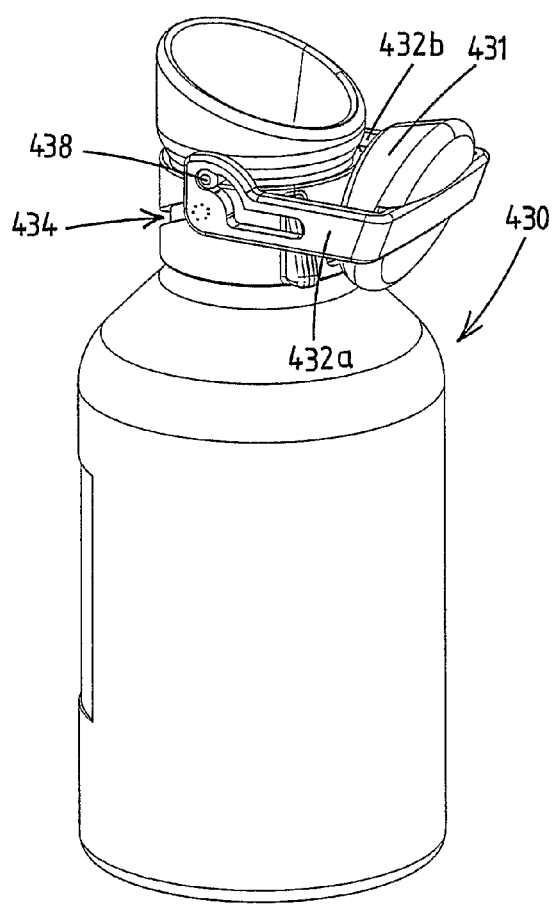
Fig 34c
Fig 34d

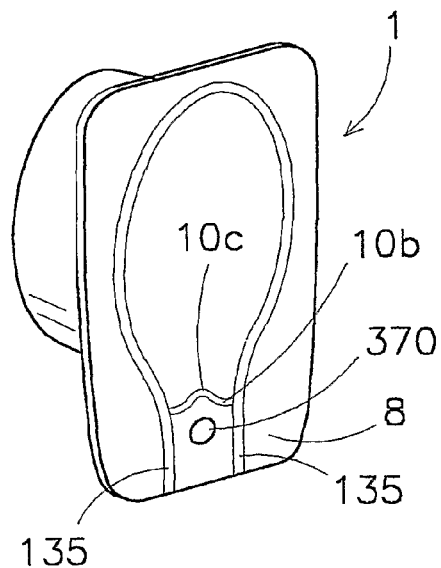
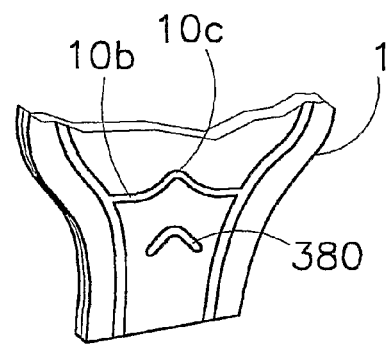
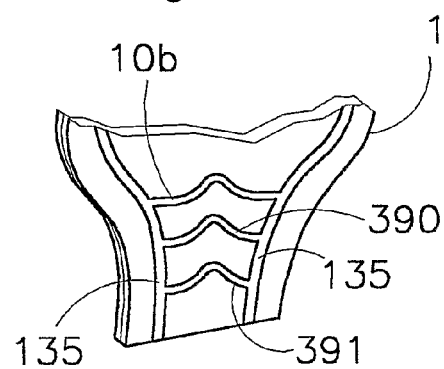
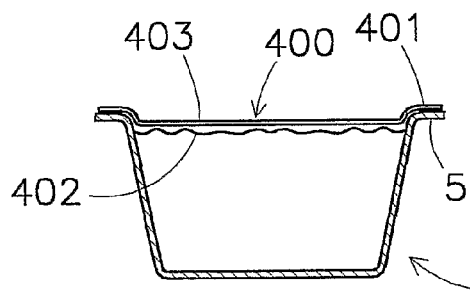
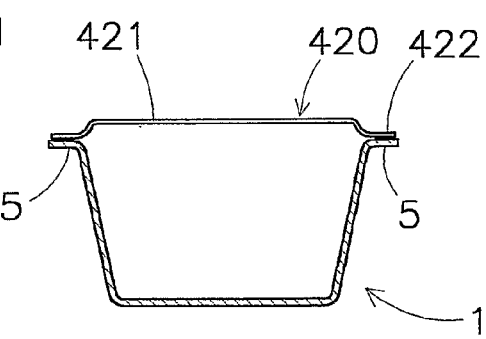
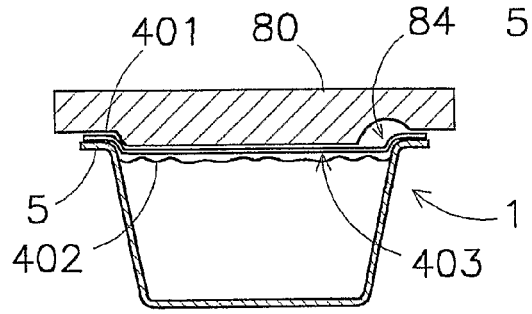
Fig 37
Fig 38
Fig 39
Fig 40
Fig 41
Fig 42

DISPENSING OF A SUBSTANCE

CROSS-REFERENCE TO RELATED APPLICATIONS

This application is the National Stage of International Application No. PCT/EP2005/001541, filed Feb. 11, 2005, which claims the benefit of European Application Nos. EP 0407554.1, filed Feb. 18, 2004 and EP 04076206.4, filed Apr. 21, 2004, the contents of all of which are incorporated by reference herein.

FIELD OF THE INVENTION

The present invention relates to dispensing of a substance from a container by means of a dispensing apparatus.

BACKGROUND OF THE INVENTION

EP 278 773 describes a beverage dispensing apparatus. The dispensing apparatus is adapted to empty a bag containing a flavouring constituent for the preparation of a carbonated beverage. The bag is inserted into a receiving and actuating unit, which has means to compress the bag and expel the content out of it into a discharge nozzle. The discharge nozzle is also connected to a feed conduit for feeding carbonated water. The feed conduit is provided with a closing valve, which can be opened by operating a lever by pressing a serving cup against it. The flavouring constituent and the carbonated water are thus mixed in the discharge nozzle before they are dispensed in the serving cup. When different bags with different flavours are inserted subsequently in the receiving unit, a cross contamination between different flavours can occur. Next to the part for serving carbonated drinks the known dispensing apparatus has also separate spigots for hot water and cold water.

SUMMARY OF THE INVENTION

The present invention proposes to dispense a substance from a container filled with a single portion of a substance. The container comprises a preformed deformable body, preferably made of sheet material, defining a filling cavity which body has an opening and an integral planar circumferential rim surrounding said opening, which opening is closed by a cover sheet which is sealed to the circumferential rim by means of a circumferential sealing seam.

Such a container as such is known. For example EP 299 571 shows a container for a small quantity of milk, cream or the like. The container has a bottom and a wall of rigid plastic defining a filling cavity. Further, the container is provided with a channel, which is in communication with the filling cavity. A cover sheet covers the filing cavity and the channel. The cover sheet has a pulling tab by means of which it can be pulled away at the channel for forming an opening through which the content of the container can be dispensed.

According to the invention the substance, e.g. syrup for a soft drink is dispensed directly from the container into a serving container, e.g. a cup or a bottle. Also the water is dispensed into the serving container such that mixing takes place in the serving container thereby preventing the contamination of the dispensing apparatus with the substance.

The invention proposes to open the container with the substance by making use of the deformability of the cover. The container is held in receiving means and the cover sheet is engaged with a support surface provided with a recess. The support surface supports the cover sheet except at the position of the recess. The recess is positioned at least over a part of the circumferential sealing seam. Then the container body is compressed whereby the substance is pressurized and the cover bulges out into the recess such that the sealing seam is broken at the location where the bulge is formed resulting in the container being open. This way of opening the container requires no cutting means or other means adapted to open the container that could get contaminated with the substance, which is advantageous in view of hygiene.

Preferably the container is manufactured by a vacuum or thermo forming process. A flat sheet, preferably of plastic, preferably polystyrene, or aluminium, is placed in a vacuum or thermo forming apparatus with a forming die and multiple container bodies are formed simultaneously in the sheet by vacuum forming the filling cavities into the die. Then the sheet with the filling cavity is placed in a filling machine and filled with substance. The sheet with the container bodies is covered with a cover sheet preferably of covering foil that is sealed over it resulting in the containers being closed. Finally, the sheet with the closed containers is placed in a punch machine, where the perimeter of the circumferential rim of the body is formed by punching out waste material between the containers.

Preferably, the sheet of covering foil is manufactured of aluminium or another material, preferably a multilayer material. Alternatively, the cover sheet can be of material, e.g. from polystyrene or polyethylene, which can in a possible embodiment be manufactured by thermoforming as a preformed cover.

In an advantageous embodiment the covering sheet is provided with identification means. The identification means correspond to the substance contained in the container so as to allow automatic identification of the container. This container can be placed in a dispensing apparatus comprising identification recognition means for automatically identifying the container and the substance therein.

The invention will become more apparent from the following description with reference to the drawings.

BRIEF DESCRIPTION OF THE DRAWINGS

FIG. 3 shows a view in perspective of the container of FIG. 1 in a compressed state, FIG. 4a shows a front view of the container of FIG. 3, FIG. 4b shows a top view of the container of FIG. 3, FIG. 4c shows a side view of the container of FIG. 3, FIG. 14a shows a further embodiment of a container with a dispensing channel with a closed end, FIG. 14b shows a detail of the container of FIG. 14a, FIG. 14c shows the dispensing channel of the container of FIG. 14a after the channel has been opened, FIG. 15 shows a top view of an alternative embodiment of a container, FIG. 15c shows an alternative embodiment of a covering lid for a dispensing apparatus which can be used with containers of FIGS. 15, 15a and 15b, FIG. 20 shows a cross section of an embodiment of the receiving means provided with heating elements, FIG. 21a shows a cross section of an embodiment of the receiving means with a certain piston form before compression of the container, FIG. 21b shows the cross section of the receiving means of FIG. 21a after compression of the container, FIG. 23a shows a perspective view of the dispensing apparatus of FIG. 6 with a bottle placed in it, FIG. 23b shows a front view of the dispensing apparatus of FIG. 23b, FIGS. 25a and 25b show a perspective view and a cross section respectively of a preferred embodiment of the receiving means in a first state, FIGS. 26a and 26b show a perspective view and a cross section respectively of a preferred embodiment of the receiving means in a second state, FIGS. 29a and 29b show a perspective view and a cross section respectively of a preferred embodiment of the receiving means in a fifth state, FIGS. 30a and 30b show a perspective view and a cross section respectively of a preferred embodiment of the receiving means in a sixth state, FIGS. 34a-d show a preferred embodiment of a bottle that can be used in the dispensing apparatus of the invention, FIG. 37 shows a view in perspective of an embodiment of a container with an obstruction in the dispensing channel, FIG. 38 shows a top view of a part of another embodiment of a container with an obstruction in the dispensing channel, FIG. 39 shows a top view of a part of an embodiment of a container with multiple seals in the dispensing channel, FIG. 40 shows a cross sectional view of an embodiment of a container with a countersunk cover sheet, FIG. 41 shows a cross sectional view of the container of FIG. 40 in combination with a covering lid of a dispensing apparatus, FIG. 42 shows an alternative embodiment of a container according to the invention with a preformed cover.

DETAILED DESCRIPTION OF THE INVENTION

Figure 1:
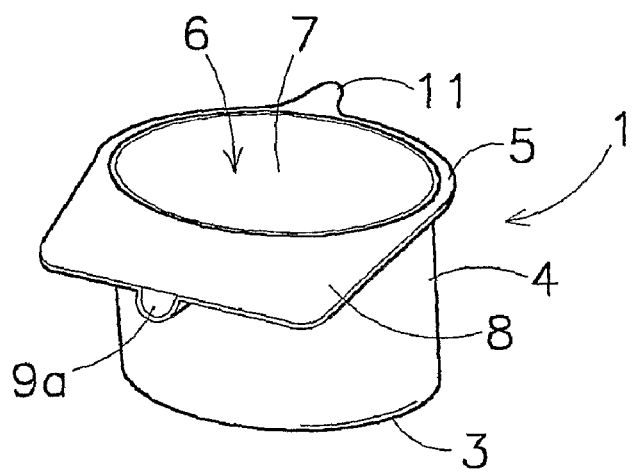
FIG. 1 shows a view in perspective of a preferred embodiment of a container according to the invention.

FIGS. 1, 2a-2c show a container 1 for containing a substance. The container 1 comprises a deformable body preferably made of plastic sheet material. The body can also be made of another material, e.g. aluminium or laminated cardboard paper. Preferably the body has a bottom 3 and a side wall 4 extending from the bottom 3, which define a filling cavity. On the side opposite the bottom 3 a planar circumferential rim 5 is integral with the side wall 4 and extends outwardly therefrom. The circumferential rim 5 surrounds an opening 6. A cover sheet 7 of foil material is sealed to the circumferential rim 5 by means of a circumferential sealing seam 10 and closes the opening 6. The foil material can be a multilayer material.

Figure 2B:
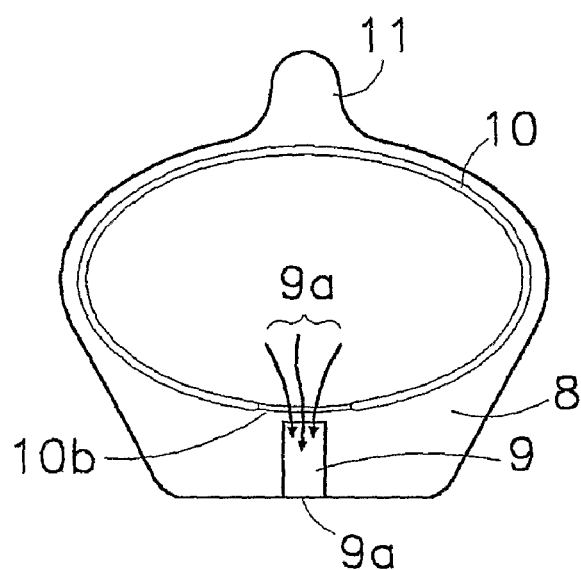
FIG. 2b shows a top view of the container of FIG. 1.

In FIG. 2b is shown a top view of the container 1 without the cover sheet. The circumferential rim 5 has an extending tab 8 with a dispensing channel 9 formed by a depression in the tab 8. Further, the circumferential rim has a gripping tab 11 diametrically opposite the extending tab 8. The cover sheet 7 is also sealed to the extending tab 8 and preferably also to the gripping tab 11.

Figure 2C:
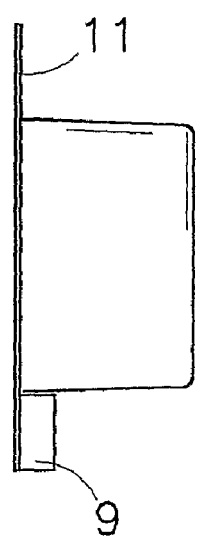
FIG. 2c shows a side view of the container of FIG. 1.
Figure 2A:
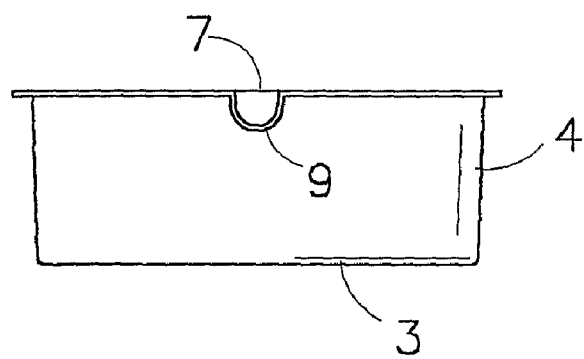
FIG. 2a shows a front view of the container of FIG. 1.

The dispensing channel 9 has an open end 9a at the edge of the extending tab 8. The extending tab 8 with the channel 9 is covered by the cover sheet 7. As can be seen in FIGS. 2b and 2c, the dispensing channel 9 is separate of the filling cavity, that is, it does not join the filling cavity. When the filling cavity is filled with substance and the covering sheet is applied to the container, zone 10b of sealing seam 10 near the dispensing channel 9 forms a barrier for the substance between the cavity and the dispensing channel 9.

Preferably, the zone 10b of the circumferential sealing seam 10 at the location of the dispensing channel 9 is weakened. This can be done by giving the sealing seam 10 a smaller width near the dispensing channel 9 than at the rest of the circumference (see FIG. 2b). Another possibility is to heat the sealing seam 10 locally near the dispensing channel 9 during or preceding the opening of the container, such that the sealing seam is weakened locally.

When in use the container body can be compressed, thereby pressurizing the content of the container 1. By the increasing pressure on the inside of the container 1, the sealing seam 10 breaks at said zone 10b and a passage is formed between the cover sheet 7 and the area of the tab surface that connects the filling cavity with the dispensing channel, so as to allow substance to pass through the passage from the cavity into the channel 9. This is illustrated with arrows 90 in FIG. 2b.

Figure 6:
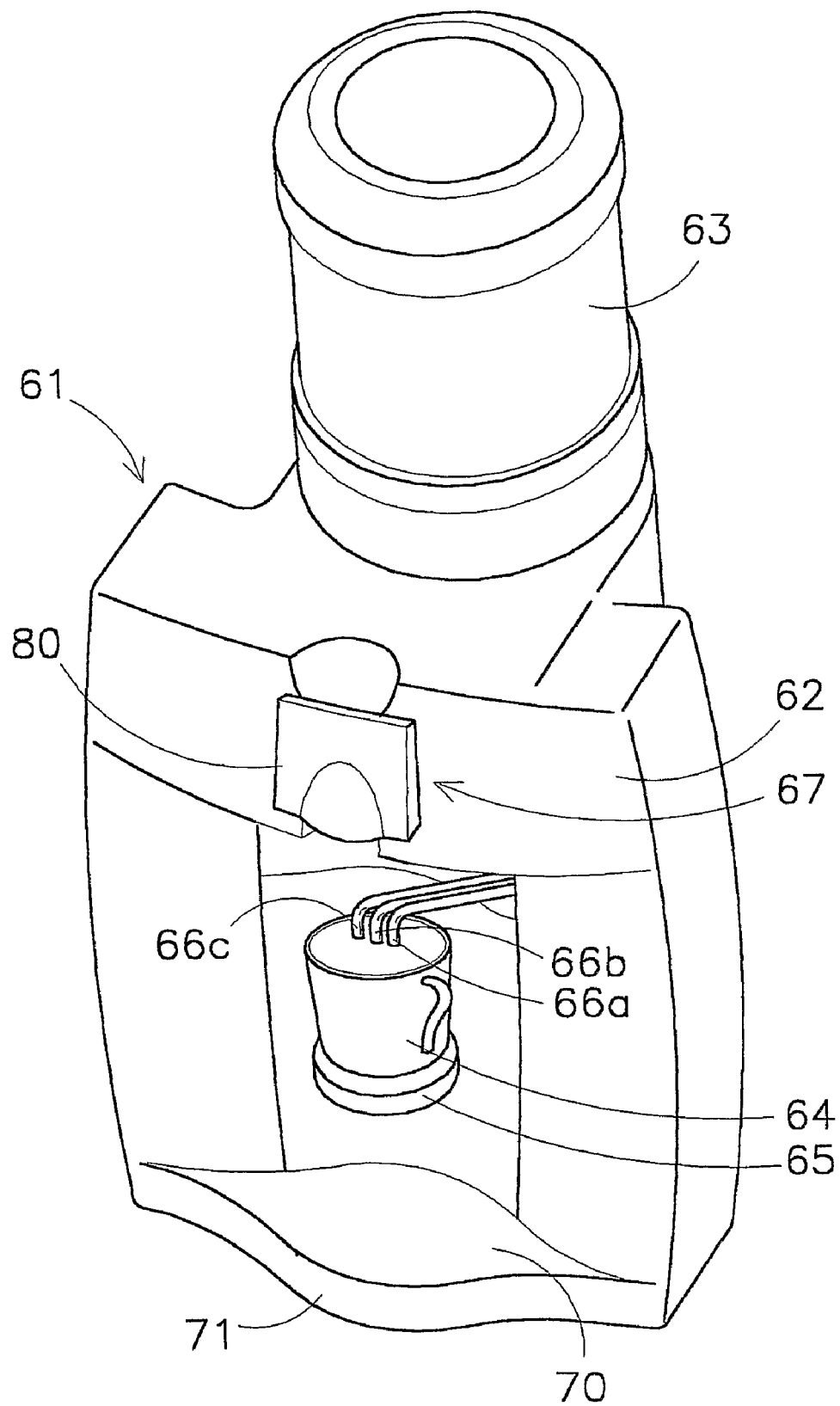
FIG. 6 shows a perspective front view of another embodiment of a drink dispensing apparatus with receiving means for the container of FIG. 1.
Figure 7:
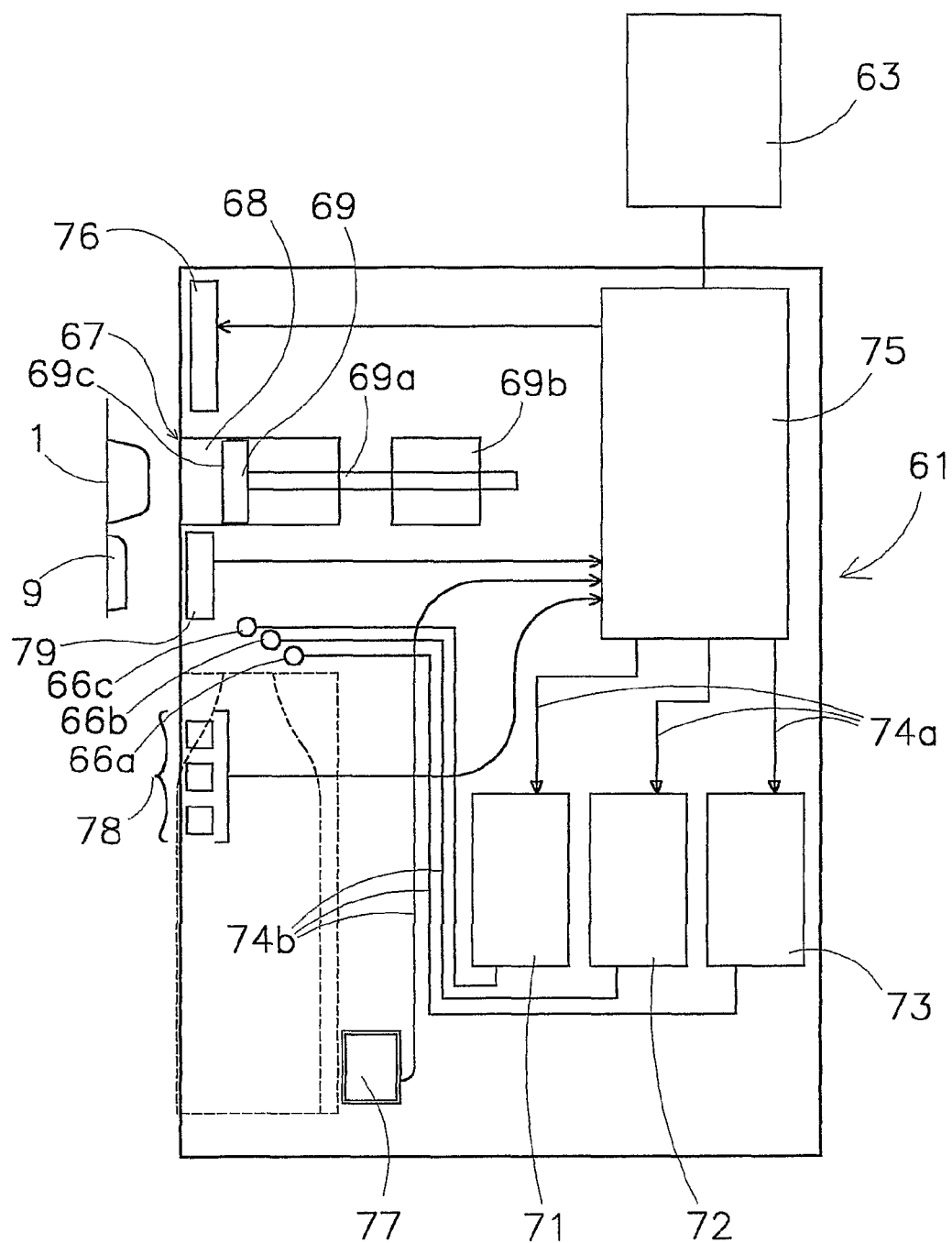
FIG. 7 is a schematic cross section of the dispensing apparatus of FIG. 6.
Figure 8:
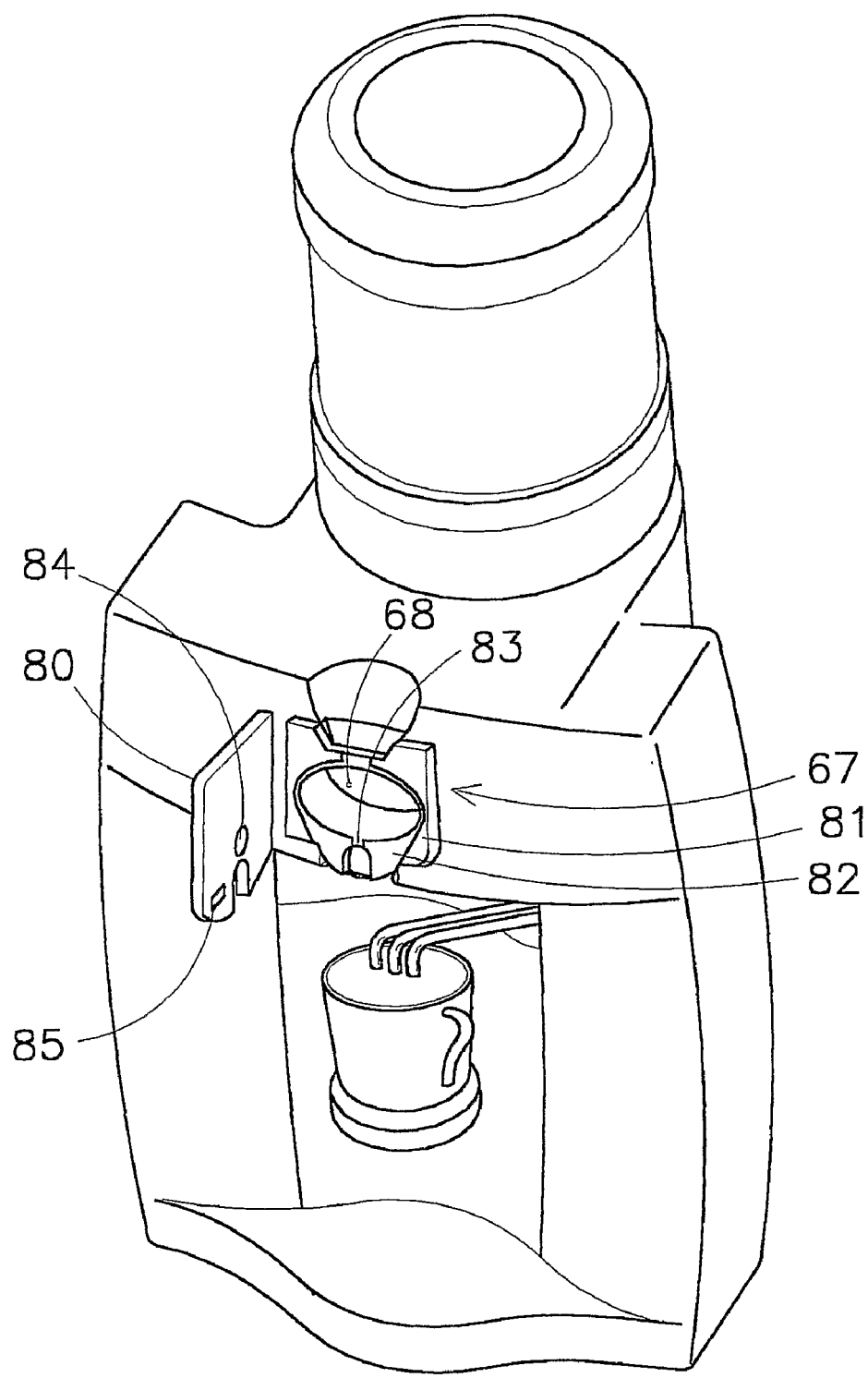
FIG. 8 shows a perspective front view of the dispensing apparatus of FIG. 6 with an opened lid of the receiving means.

FIGS. 6-8 show a drink dispensing apparatus 61 with housing 62. On top of the housing 62 is placed a water tank 63, for feeding water. In another embodiment it is also possible to provide the apparatus with an internal water storage tank. It is also possible to connect the apparatus to a water supply line. From the housing 62 is extending a platform 65 for placing a cup 64 or another serving container on which is to be filled with a drink. Above the cup 64 are arranged three dispensing pipes 66a, 66b and 66c, through which can be dispensed cold water, warm water and carbonated water respectively. At the lower side under the platform 65 a platform 70 is arranged. The platform 70 can be formed as a grid with a collecting receptacle 71 underneath for collecting spilled water. The collecting receptacle 71 can be removable so that it can be cleaned. In a further embodiment an evaporator can be arranged in the collection receptacle to evaporate spilled fluid, such that the receptacle does not have to be emptied too often.

It is also possible to place bottles and the like in the apparatus. The bottle can be placed on the platform 70. In FIG. 23a and 23b the dispensing apparatus 61 is shown with a specially designed bottle 230 in it. The bottle 230 has a top part 231, which is adapted to fit in a sealing manner under the receiving means 67 such that dispensed substrate and water cannot be spilled during dispension. To that end the receiving means 67 can be provided with sealing means like a sealing gasket or the like.

In FIGS. 34a-d a further embodiment of a bottle 430 for the dispensing apparatus 61 is shown. In this embodiment the bottle 430 has a plug-like closing member 431. Around the bottle neck a rotatable ring 433 is arranged. In the ring 433 are provided two slots 434 that extend in a helical manner through the ring 433. On the ring 433 is provided a gripping fin 436.

The closing member 431 is coupled to the ring 433 by a bracket 432 with two legs 432a en 432b. Each leg 432a, 432b has a protrusion 435 that extends inwardly and are each inserted in one of the slots 434. In each of the legs 432a and 432b of the bracket 432 is provided a guiding slot 437 comprising an upper straight slot portion 437a and a lower curved portion 437b. On the bottle neck are on diametrically opposite sides provided guiding pins 438 which each are received in one of the guiding slots 437.

Figure 34A:
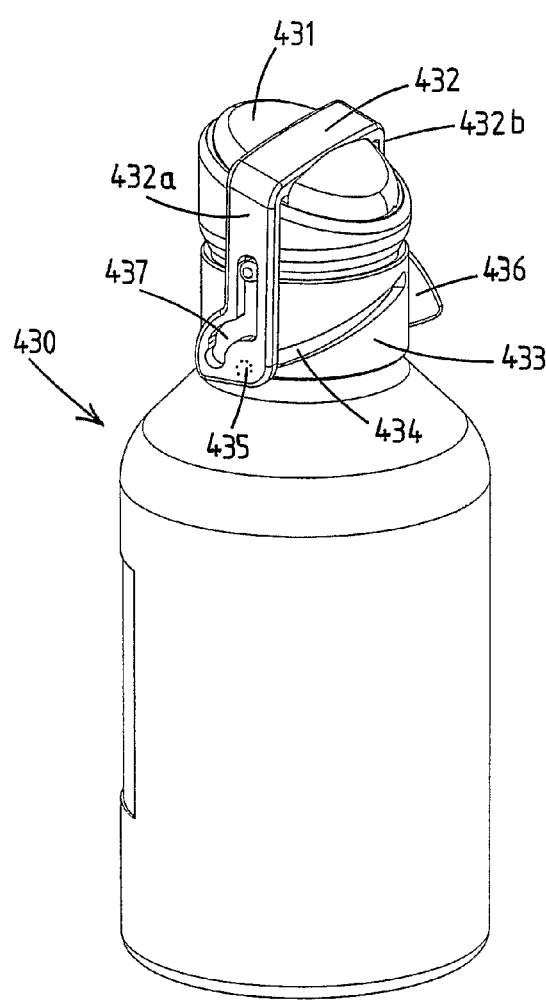
Figure 34B:
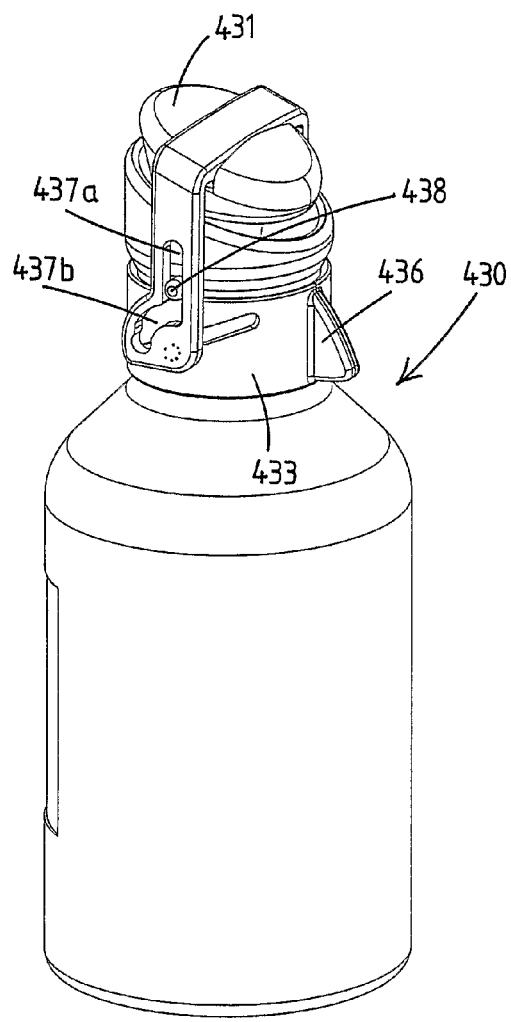

In use the bottle is closed by the closing member 431 as is shown in FIG. 34a. A person can open the bottle 430 by gripping the gripping fin 436 and rotating the ring 433. By this rotation the helical form of the slots 434 force the protrusions 435 on the bracket legs 432a and 432b upwards as can be seen in FIG. 34b. The covering member 431 is thus lifted from the bottle 430 guided by the guiding pins 438 in the straight portions 437a of the guiding slots 437.

At a certain point the bracket 432 is lifted such a distance that the curved portions 437b of the guiding slots 437 reach the guiding pins 438. By rotating the ring 433 further the bracket 432 will start to tilt due to the cooperation of the guiding pins 438 and the curved portions 437b of the guiding slots as can be seen from FIG. 34c. The closing member 431 is tilted away from the bottle 430 until the end position is reached, i.e. the position in which the curved portions 437b of the guiding slots 437 engage the guiding pins 438 as is shown in FIG. 34d. In the state shown in FIG. 34d the user can place the bottle in the dispensing apparatus to fill it or can poor drinks from the bottle 430.

For closing of the bottle 430 the ring 433 is rotated in the opposite direction and the opposite sequence as described with reference to FIGS. 34a-d is followed.

The dispensing apparatus comprises receiving means 67 for receiving a container 1 as is described hereabove, filled with a single portion of a substance, e.g. coffee concentrate or syrup for a soft drink.

In FIG. 7 is shown a schematic cross section of the apparatus 61. The water from the tank 63 can be directed by means of a control system 75 through feed lines 74a to a cooling system 73, a heating system 72 and a carbonating system 71, which are connected with the three dispensing pipes 66a, 66b and 66c respectively by feed lines 74b. The carbonating system 71 preferably comprises a bottle filled with $CO_2$ which will be described below.

Figure 5:
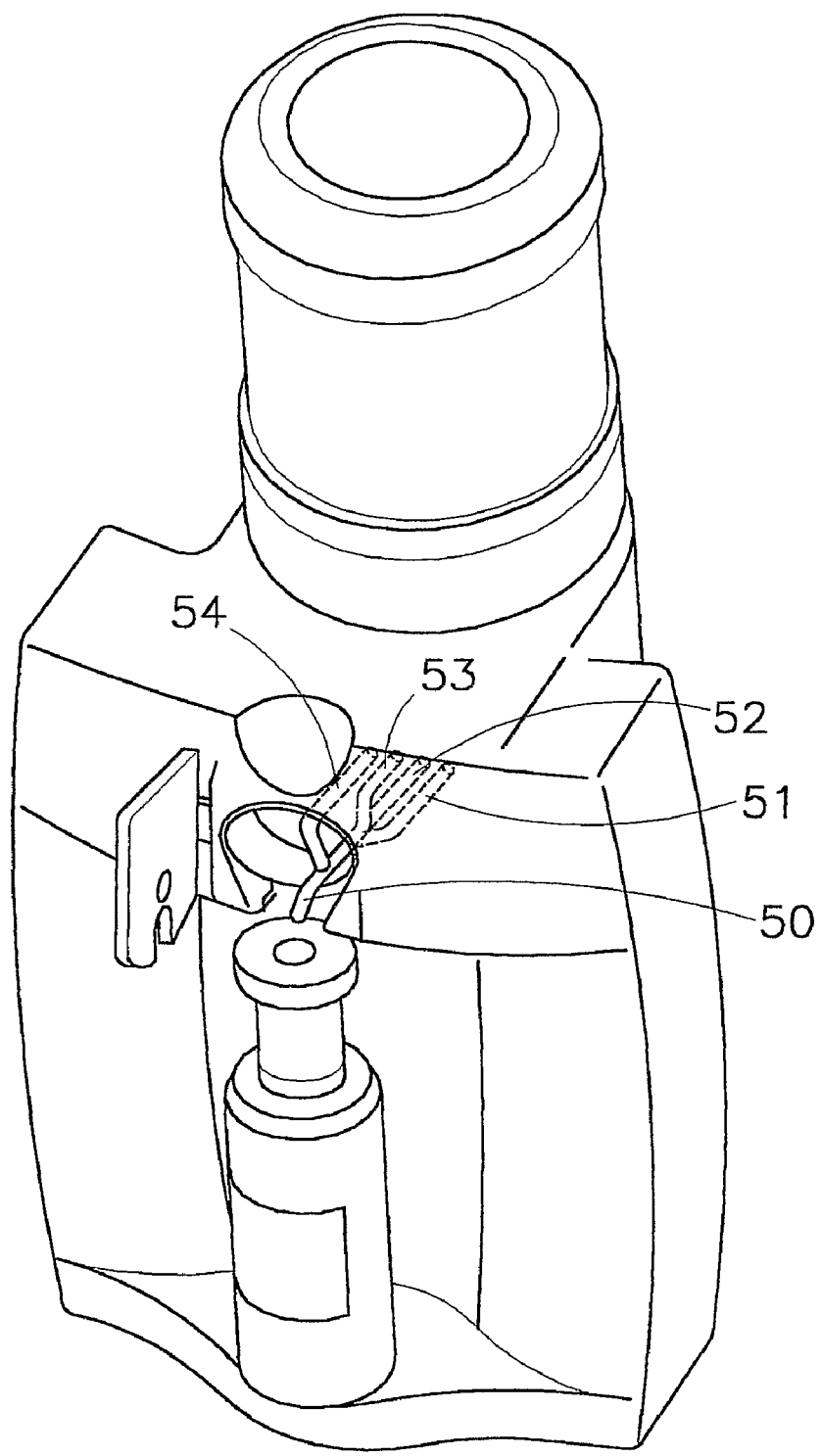
FIG. 5 shows a perspective front view of an embodiment of a drink dispensing apparatus with receiving means for the container of FIG. 1.

It is also possible to have four lines 51-54 that are all connected to one central dispensing pipe 50 as is shown in FIG. 5. The dispensing pipe 50 is directed such that the water is ejected in the beam of substance that is dispensed from the container 1, such that a good mixing between the two is secured. The four lines 51-54 are for feeding hot water, cooled water, water with an ambient temperature and carbonated water to the dispensing pipe 50.

Figures 35A, 35B, 35C:
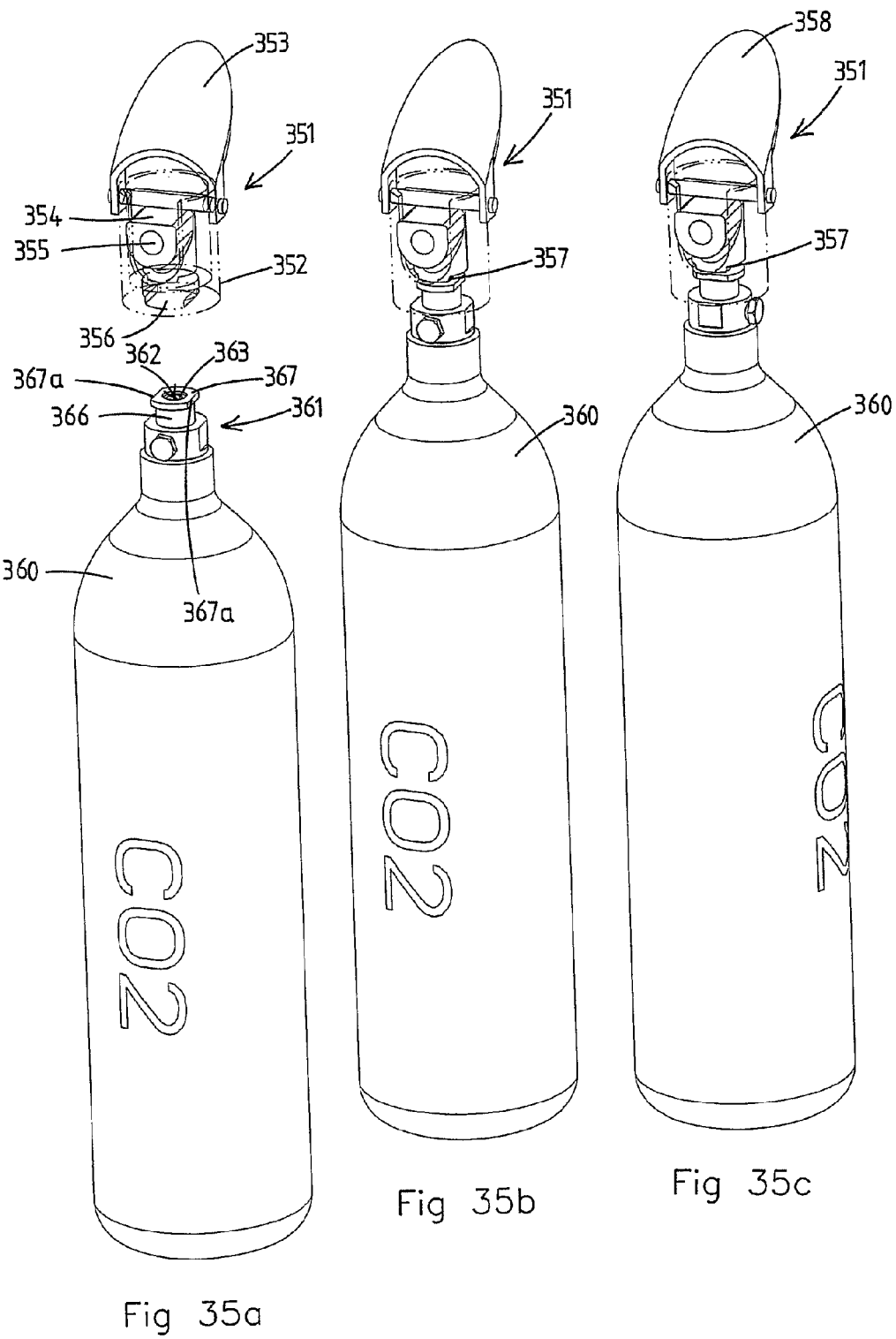
FIGS. 35a-e show steps of the connecting of a $CO_2$ bottle with a connecting arrangement.

In FIG. 35a is shown how a $CO_2$ bottle 360 is positioned under a valve arrangement 351.

The $CO_2$ bottle 360 is provided with a closing valve 361. The closing valve 361 has a housing 366 with an outlet 362 which is closed of by a preferably spring loaded closing member 363 that has to be pushed down such that the outlet 362 is opened. On the upper side of the valve housing 366 is provided a circumferential flange 367 with two straight edges 367a.

The connecting arrangement 351 comprises a substantially cylindrical housing 352. Within the housing 352 a connecting means 354 is slideably arranged. The connecting means 354 can slide between a released position and a connected position within the housing 352. In FIGS. 35a-c the connecting means 354 is in the released position in FIGS. 35d, 35e and 36 the connecting means 354 is in the connected position.

The connecting means 354 has an outlet 355 to which a pipe or a hose can be connected. The connecting means 354 fits on the closing valve 361 on the $CO_2$ bottle 350 and comprises a protruding member (not shown) which is suitable for pushing down the closing member 363 and opening the valve 361. The protruding member is circumvented by a sealing ring (not shown) so as to prevent the escape of $CO_2$ gas from the bottle 360 during use.

Figures 35D, 35E:
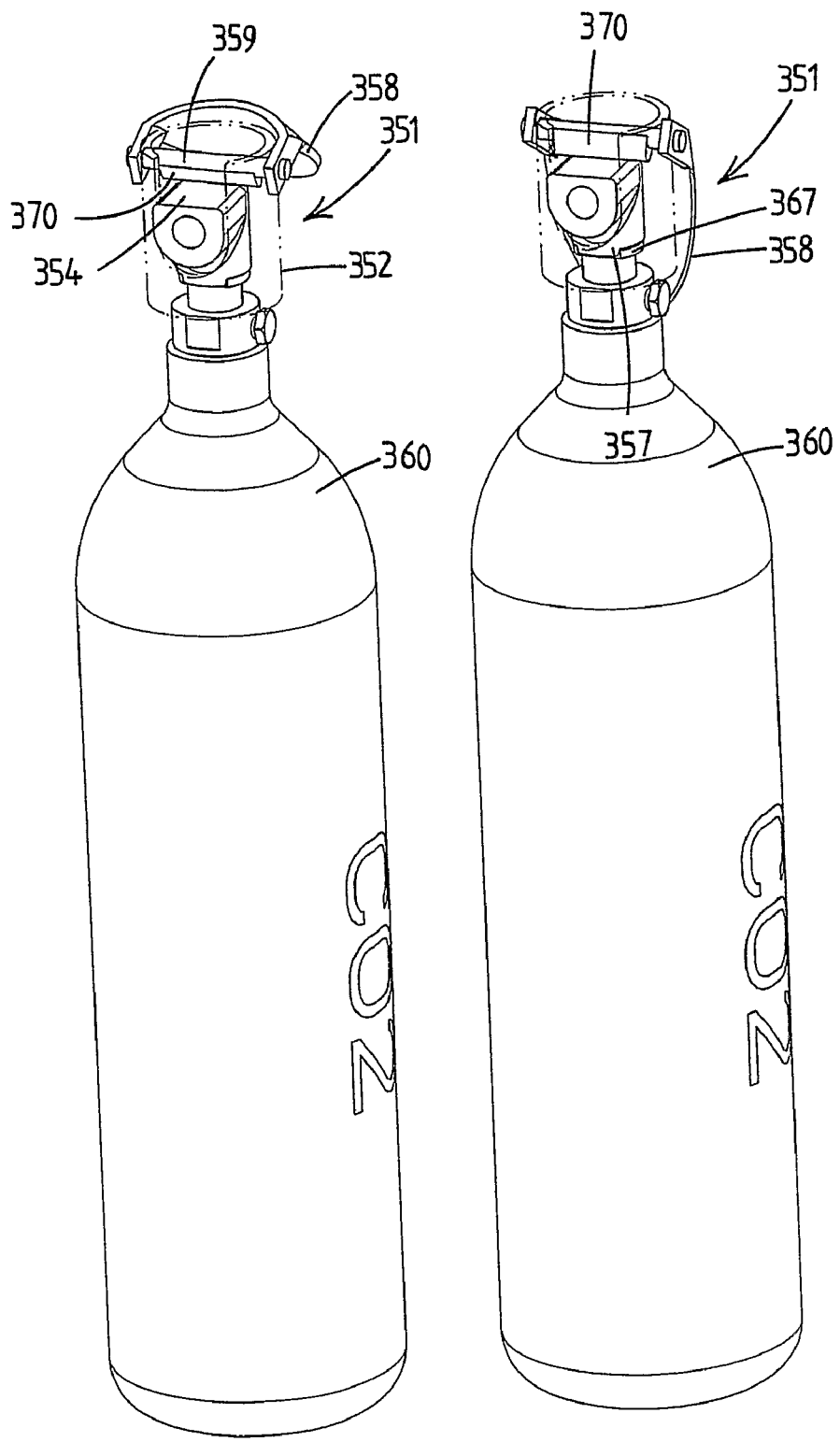
Figure 36:
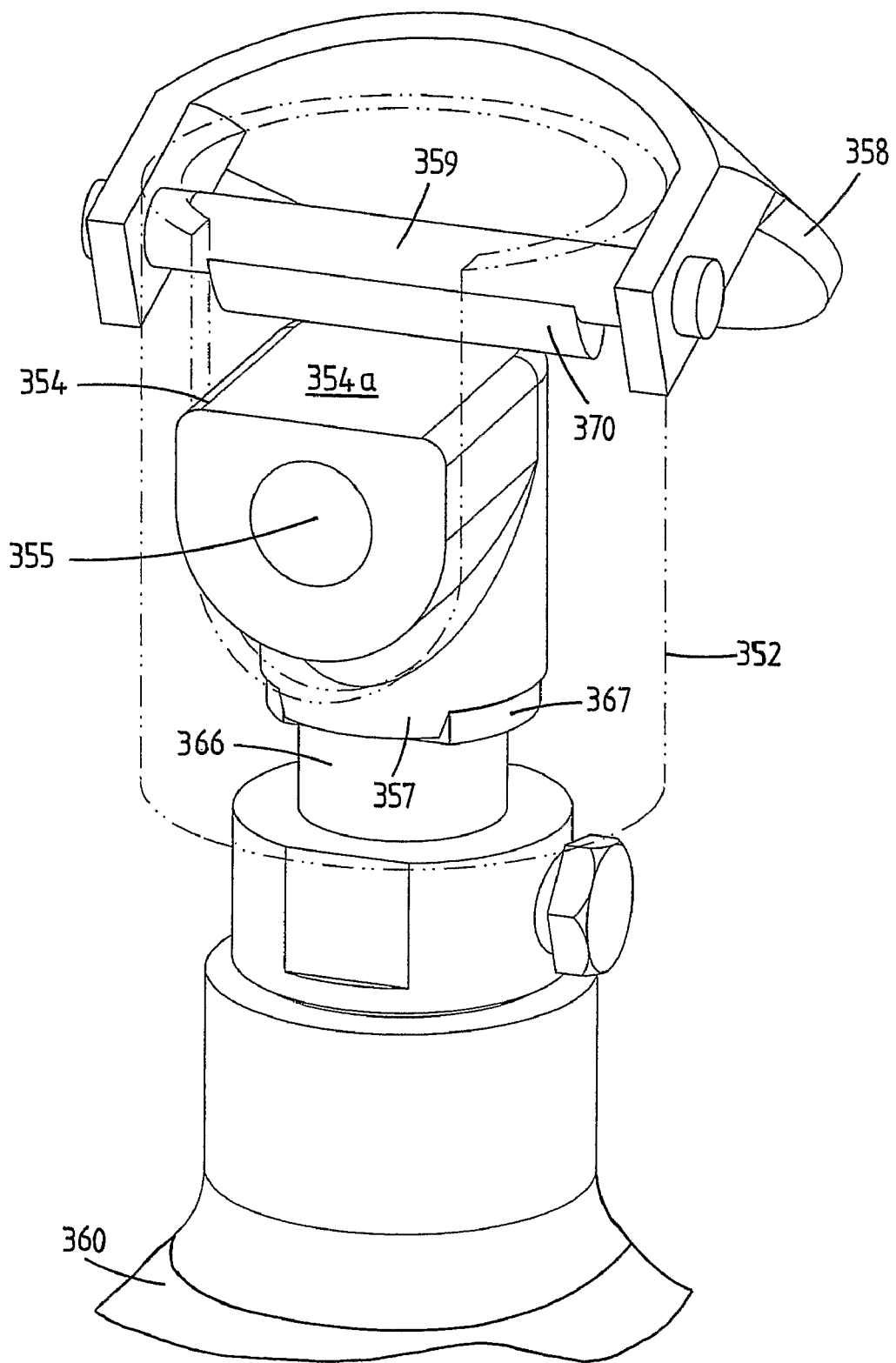
FIG. 36 shows in more detail a part of FIG. 35d.

The cylindrical housing 352 of the connecting arrangement 351 has an opening 356 at the lower end which has a form complementary with the flange 367 of the valve 361. In use the cylindrical housing 352 is placed over the flange 367 and the valve as is shown in FIG. 35b. Next, the bottle 360 is rotated over 90° as is shown in FIG. 35b. The lower end of the connecting means 354 is provided with two lips 357 (see also FIG. 36) which fit over the straight edges of the flange 367. These lips 357 are in FIG. 35c just above the straight edges of the flange 367. Next the connecting means is moved downwards by pushing a lever 358 down as is shown in FIGS. 35d and 36. The lever 358 rotates about an axis 359 which is provided with a cam 370. The cam 370 engages the top surface 354a of the connecting means 354. The rotation of the cam 370 results in the connecting means 354 being pushed down to the connected position (see FIG. 35e). In this connected position the lips 357 are positioned over the straight edges 367a. This prevents that the bottle is rotated with respect to the connecting means 354 during use, which could lead to damaging of sealing means and/or the leakage of $CO_2$ gas.

The receiving means 67 of the dispensing apparatus have a compression chamber 68 with a variable volume. The compression chamber 68 is delimited by a piston 69 with a screw spindle 69a that is driven by a linear electric motor 69b. The piston is adapted to engage the bottom 3 of the container 1. In other possible embodiments (not shown) the drive means can comprise pneumatic means, hydraulic means or can be adapted to be hand driven.

The piston can have a form adapted to deform the container in a specific form. In FIG. 7 is schematically shown that the piston 69 has a flat front face 69c with a diameter that corresponds substantially with the inner diameter of the compression chamber 68.

In FIG. 21a is shown another piston 210 with a rear portion 210b with a constant diameter that substantially corresponds to the inner diameter of the compression chamber 68, and with a substantially cone shaped front portion 210a with a front face 210c which has substantially the same diameter as the bottom 3 of the container 1. The cone shaped portion 210 has a surface 210d with a convex curved form. This form of the piston 210 allows the container 1 to deform and wrinkle in the area between the surface 210d of the cone shaped portion 210a and the wall 68a of the compression chamber 68, as can be seen in FIG. 21b.

Figure 22A:
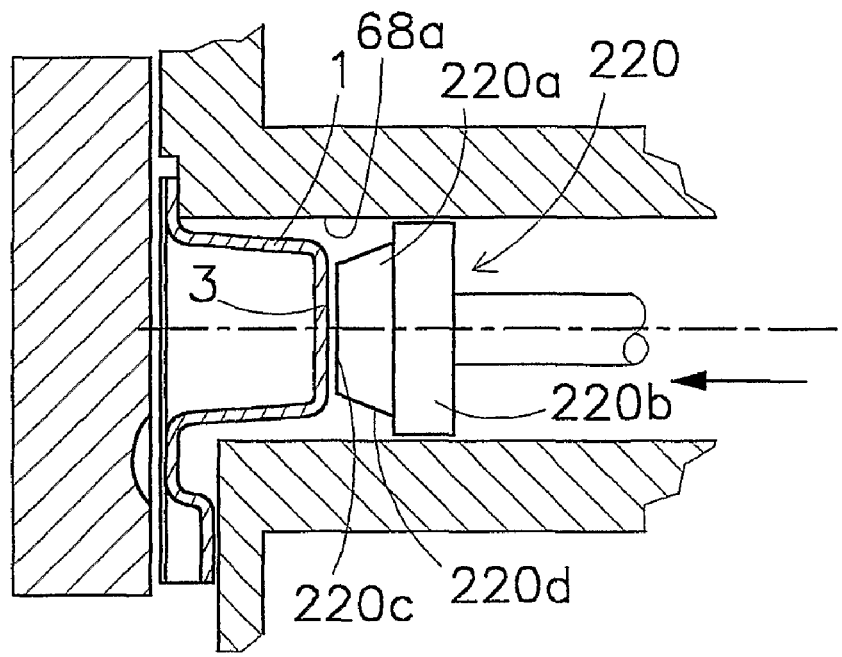
FIG. 22a shows a cross section of an embodiment of the receiving means with another piston form before compression of the container.
Figure 22B:
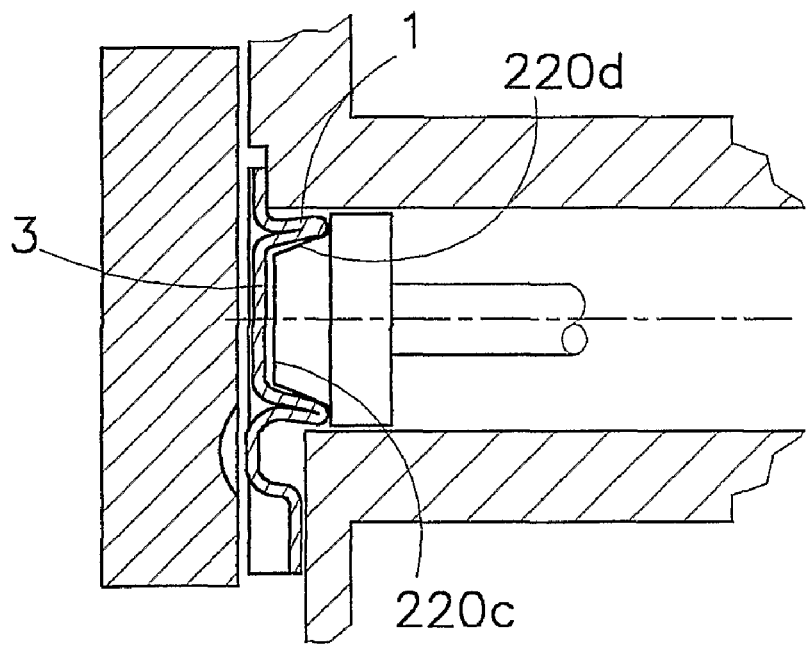
FIG. 22b shows the cross section of the receiving means of FIG. 22a after compression of the container.

In FIG. 22a is shown a piston 220 with a cone shaped portion 220a with a linear decreasing surface 220d. The front face 220c has a smaller diameter than the diameter of the bottom 3 of the container 1. The form of the piston 220 allows the container 1 to deform and fold in the area between the surface 220d of the cone shaped portion 220a and the wall 68a of the compression chamber 68, as can be seen in FIG. 22b.

The pistons 210 and 220 can advantageously be used to compress the container 1 such that almost all substance in the filling cavity is dispensed. This means that there are only small losses which is advantageous from an economic view point.

Figure 24:
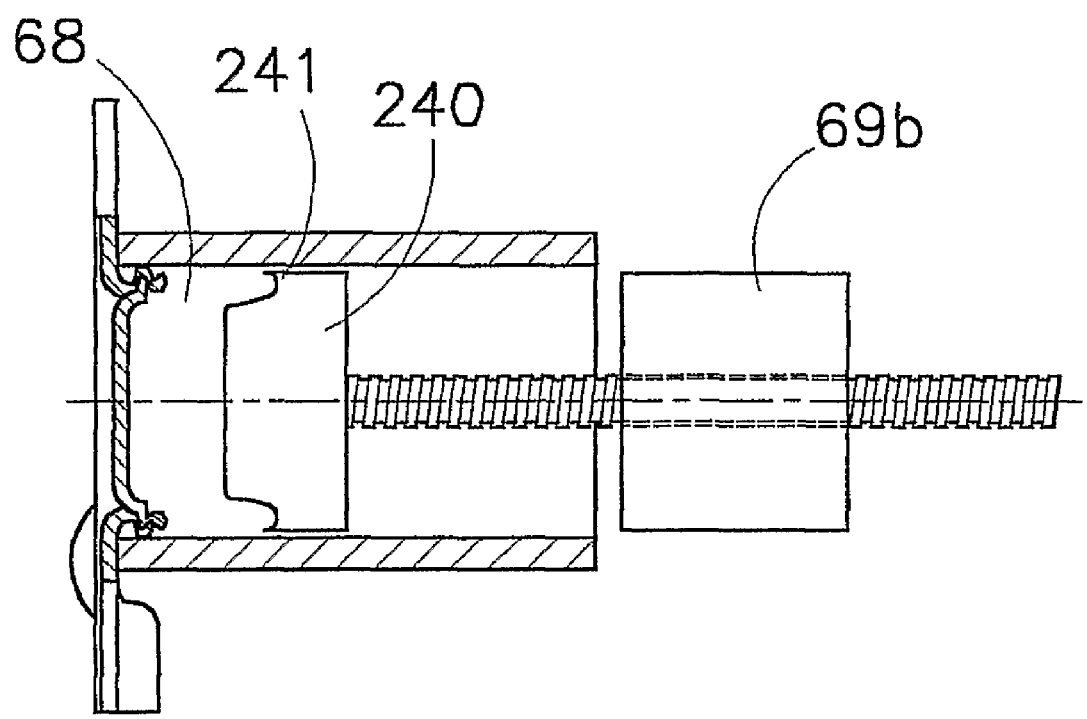
FIG. 24 shows a cross section of an embodiment of the receiving means with yet another piston form before compression of the container.

In FIG. 24 a piston 240 is shown with a scraping edge 241. The scraping edge 241 prevents that during compression of the container no container material gets stuck between the inner surface 68a of the compression chamber 68 and the piston 240, which could cause jamming of the piston.

The receiving means 67 have a covering lid 80 which hinged and can be opened (see FIG. 8) and closed (see FIG. 6). Further, the receiving means 67 have a front plate 81. The front plate 81 is provided with a recess 82 with a depth substantially corresponding to the thickness of the circumferential rim 5 with the extending tab 8 and the gripping tab 11 of the container 1. The bottom of the recess 82 forms a stop face engaging the back side of the circumferential rim 5. Further, there is provided in the recess 82 a deeper recess 83 in which the dispensing channel 9 of the container 1 can be received. This deeper recess 83 has the advantage that the container 1 can only be placed in one manner in the receiving means, thereby securing a proper functioning and use of the apparatus.

The covering lid 80 is provided with a recess 84 which, when a container 1 is received in the receiving means, is placed over the zone 10b of the circumferential rim 10 near the dispensing channel 9.

Figure 9:
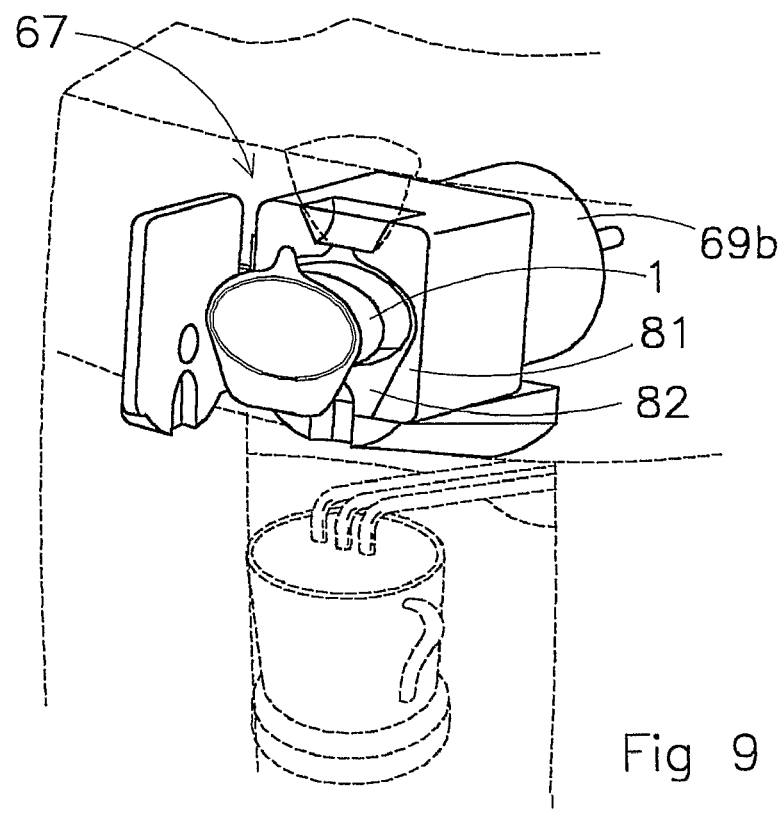
FIG. 9 shows how the container of FIG. 1 is inserted in the dispensing apparatus of FIG. 6.
Figure 10:
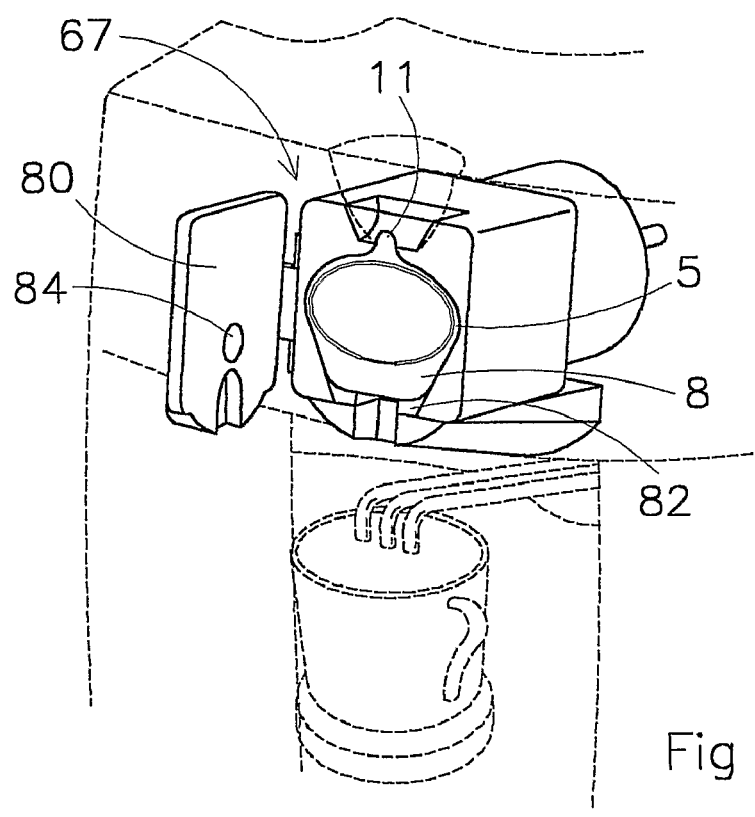
FIG. 10 shows the container of FIG. 1 is in the full inserted state in the dispensing apparatus of FIG. 6.

In FIG. 9 is shown how a container 1 is placed in the receiving means 67. The perimeter of the recess 82 preferably fits around the perimeter of the circumferential rim 5 of the container 1 with the tabs 8 and 11 as is best seen in FIG. 10. In this way the container 1 can be placed only in a correct manner in the receiving means 67 and it is the dispensing channel 9 of the container 1 is always directed downwards such that the substance is always correctly dispensed in the cup 64 or another serving container positioned in the dispensing apparatus 61.

Then the covering lid 80 is closed such that the recess 84, is positioned over the zone 10b of the circumferential sealing seam 10 near the dispensing channel 9. The inside of the covering lid 80 forms a support surface which supports the cover sheet 7. At the position of the recess 84 the circumferential sealing seam 10 is of course not supported. Upon compression of the container body, whereby the substance is pressurized, the cover sheet 7 bulges out locally into the recess 84 such that the sealing seam 10 is broken at the zone 10b where the bulge is formed resulting in the container 1 being open as is described hereabove.

By further compression of the container body all the substance is dispensed into the cup 64 or another container. Then cold, warm or carbonated water can be added through the pipes 66a-66c. This can be done automatically as will be described further below. Then the covering lid 80 can be opened (FIG. 11) and the container 1 can be removed from the receiving means 67. Preferably there is provided a waste container 110 arranged under the receiving means 67, which can be opened by sliding it forward. The empty container 1 can fall into the waste container 110 after which the latter can be closed again.

Figure 11:
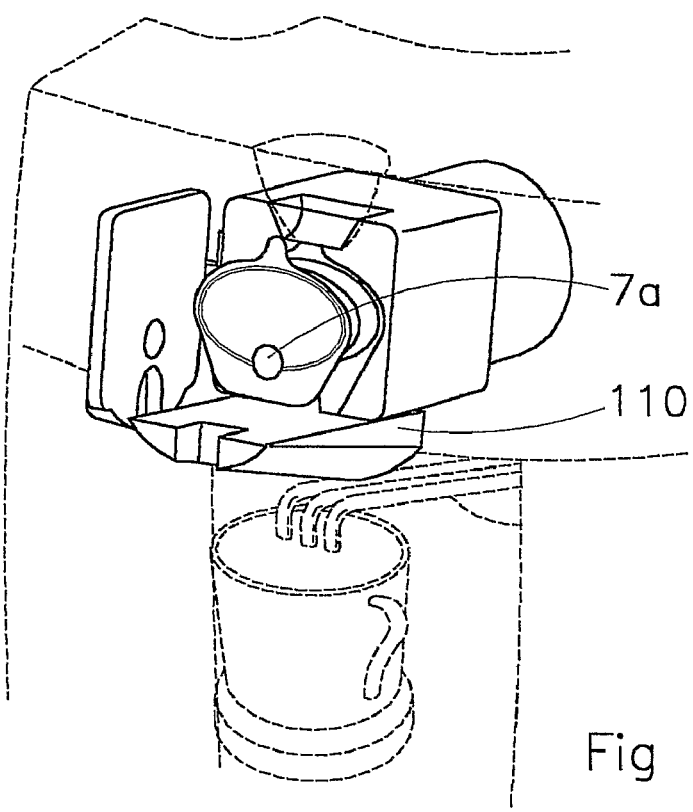
FIG. 11 shows how the compressed container of FIG. 3 is removed from the dispensing apparatus of FIG. 6.

In FIG. 11, but also in FIGS. 3, 4a-4c the container 1 is shown after compression. The bulge is indicated with reference numeral 7a. In FIGS. 4b and 4c is for clarity again indicated by arrows how the substance flows through the bulge 7a from the filling cavity into the dispensing channel 9.

Preferably the dispensing apparatus 61 comprises identification recognition means for automatically identifying the container 1 and the substance therein. To this end also the container 1 preferably comprises identification means. Preferably the identification means are applied to the cover sheet 7 of the container 1. The identification means could be visual identification means, e.g. a bar code or the like. Also electronic identification means are possible, more specifically comprising a resonance circuit or a transponder. The identification means applied to the container correspond to a specific substance contained in the container.

The identification recognition means could be a sensor 79 that is provided at the front plate 81 of the receiving means 67 as is shown in FIG. 7. Preferably a sensor 85, e.g. an optical sensor, a mechanical or an electronic sensor is provided on the covering lid 80 (see FIG. 8), such that when the covering lid 80 is closed the recognition means can detect if there is a container 1 present in the receiving means 67 and can recognize which container 1 containing a specific substance is in the receiving means 67. The sensor 79 or 85 transfers the information from the identification means to the control system 75 (see FIG. 7) which for instance is provided with an electronic memory in which the recipes for several drinks can be stored. Another possibility is that the identification means on the container 1 contain the information for the recipe which is then transferred to the control system 75.

For example, if a container 1 with concentrated coffee substance is placed in the receiving means 67 the dispensing apparatus 61 will automatically know that there has to be added a certain predetermined amount of hot water to the cup 64.

Preferably the dispensing apparatus 61 has a control panel or control buttons 78 with which a consumer can dispense water of his choice (hot, cooled, carbonated, ambient) in the cup without placing a container 1 in the receiving means 67.

Preferably the dispensing apparatus has a display 76 connected to the control system 75. On the display 76 the drink can be displayed of which the corresponding container with the substance is placed in the receiving means 67. Also a start button can be provided by operation of which the dispensing of the substance and the water starts. In this way the consumer is allowed a last check on the display 75 if he has placed the right container 1 in the receiving means 67.

The identification means could also correspond to the amount of substance in the container. There can be containers with different amounts of the same substance. Thus it is possible to have a container for the preparation of one glass of a drink, but it is also possible to have a container for the preparation of a whole bottle of that same drink. The dispensing apparatus can determine by means of the identification means and the identification recognition means what amount of water has to be added to the substance to get the right concentration for the drink.

With regard to this aspect the apparatus is preferably able not only to recognize the container that is placed in the receiving means, but also to recognize the serving container. For example a sensor is arranged which can detect whether there is placed a bottle 230 in the apparatus 61. This sensor can be connected to the control system 75. The control system 75 can determine whether a bottle 230 is placed in the dispensing apparatus 61 if a container 1 for the preparation of a bottle is placed in the receiving means 67. If not, the control system will block the dispensing of water. In this way the spilling of fluid can be prevented in case a too small serving container is placed in the dispensing apparatus. In a preferred embodiment the top part 231 of the bottle 230 (see FIG. 23) can be provided with identification means, e.g. a certain form which fits exactly in a corresponding receiving member in the dispensing apparatus. In this manner the dispensing apparatus only works with this bottle and can be guaranteed that no spilling of the drinks can take place.

With the present apparatus 61 in combination with the container 1 the substance is directly dispensed from the container 1 in a serving container like the cup 64, a glass, a jug, a decanter, a bottle or the like. The substance is treated by mixing it in the serving container with a certain amount of water. The advantage of this is that the dispensing apparatus is not contaminated with the substance. Therefore, there cannot occur a cross-contamination between substances if different drinks are prepared subsequently. The water can be added to the substance afterward, but it is also possible to dispense water into the serving container before the substance is dispensed into it. Also a simultaneous dispensing of substance and water is possible.

In a further embodiment of the dispensing apparatus a heating element is provided as is shown in FIG. 20. In the figure is shown a container 1 with part of the body arranged in the compression chamber 68 of the receiving means 67. The covering lid 80 is closed and supports the covering sheet 7 of the container 1. At the recess 84 in the covering lid 80 is arranged a heating element 200, which is biased against the covering sheet 7 on the extending tab 8 of the container 1 by a spring element 201 between the dispensing channel 9 and the filling cavity. Emerging from the front plate 81 of the receiving means 67 under the compression chamber 68 is arranged another heating element 202 that is biased against the backside of the extending tab 8 by a spring element 203. The heating elements 200 and 202 are used to heat the covering sheet 7 and the extending tab 8 at the zone 10b of the sealing seam 10 near the dispensing channel 9 of the container 1 before the container is compressed. In this way the sealing seam 10 is weakened at the zone 10b and will break at that zone 10b when the container body is compressed. It is also possible that one of the heating elements 200 and 202 is omitted.

In FIGS. 25-31 is shown a receiving means 567 of a preferred embodiment of the dispensing apparatus. For clarity the covering lid 80 is not shown in these figures. For the same reason also the covering sheet of the container 1 is omitted in these figures.

FIGS. 25a-31b show receiving means 567 which comprise a housing 590 with a substantially cylindrical bore 591. In the bore 591 a compression cylinder 580 is slidably arranged. In the compression cylinder 580 a piston 569 is slidably moveable. Thus a compression chamber 568 is formed and delimited by the inner surface of the compression cylinder and the piston 569. The compression chamber 568 has a maximum length that is determined by a most rearward position of the piston 569 in the compression cylinder 580 as is shown in FIG. 25b. Said maximum length is such that the apparatus is able to receive containers 1 of different heights, thus different volumes. Containers 1 with different volumes can be filled with the same substance with the same concentration, while the apparatus is still able to dispense drinks in different amounts. This results in a considerable advantage, because substance for a specific drink only has to be provided in one concentration rate to the manufacturer of the containers. The filling procedure of the containers is simplified, because, if after one another containers for different doses have to be filled, only the metering of the filling device has to be adapted, which in practice is an easy to perform operation. There is no need to interchange parts in the filling machine, since cross contamination between differently concentrated substances of the same flavour through the filling machine cannot occur, if containers for one and the same drink are filled.

The piston 569 is coupled to a screw spindle 569a that is driven by an electric motor 569b. At a rear side the housing 590 has a back plate 583. The screw spindle 569a and part of the motor 569b extend through an opening 584 in the back plate 583.

The cylinder 580 is provided with a pair of guiding bores 540, 541 which extend parallel to the axis through the cylinder 580 over its entire length. A pair of guiding rods 530 and 531 is arranged slidably within the guiding bores 540 and 541. The guiding rods 530 and 531 each have an end portion 530a and 531a respectively, which is attached to the back plate 583 of the housing 590.

Between a rear end of the compression cylinder 580 and the back plate 583 of the housing 590 a pair of compression springs 585 and 586 is arranged around the guiding rods 530 and 531. The compression springs 585, 586 force the compression cylinder 580 to a front position within the housing 590 as is shown in FIGS. 25 and 26. In the front position, the front face 581 of the compression cylinder 580 is in the same plane as the front face 591 of the housing 590. The front face 581 of the compression cylinder 580 is provided with a recess 582 which has a similar function as the recess in the embodiment of the receiving means 67 shown in FIGS. 8-10, but with a different outer circumferential shape and without being provided with a deeper recess for receiving a dispensing channel of the container. The form of the recess 582 is best seen in FIGS. 29a and 30a where the container 1 is removed.

Advantageously the circumferential rim 5 of the container 1 is provided with a pair of positioning projections 601 (see FIG. 32) which fit into the guiding bores 540, 541 as can be seen in FIG. 25a. In this way the container 1 can be placed in the receiving means only in one way.

The bore 591 in the housing 590 has in a front part an opening 592 towards the bottom side. A receptacle 510 is arranged directly under the opening 592 for receiving empty containers 1 as will be described later.

The working of the embodiment shown in FIGS. 25-31 will be explained in the following.

In FIGS. 25a and 25b the receiving means are in a first state in which a full container 1 is placed in the receiving means 567. The compression cylinder 580 is in a front position within the housing 590. The circumferential rim 5 of the container is arranged within the recess 582 and the projections 601 are arranged within the guiding bores. The piston 569 is in a rear position within the compression cylinder 580.

Next, the container 1 is compressed by moving the piston towards a front position in the cylinder 580 as is shown in FIGS. 26a and 26b. The container 1 is of course supported by a covering lid which is not shown in these figures.

Figures 27A, 27B:
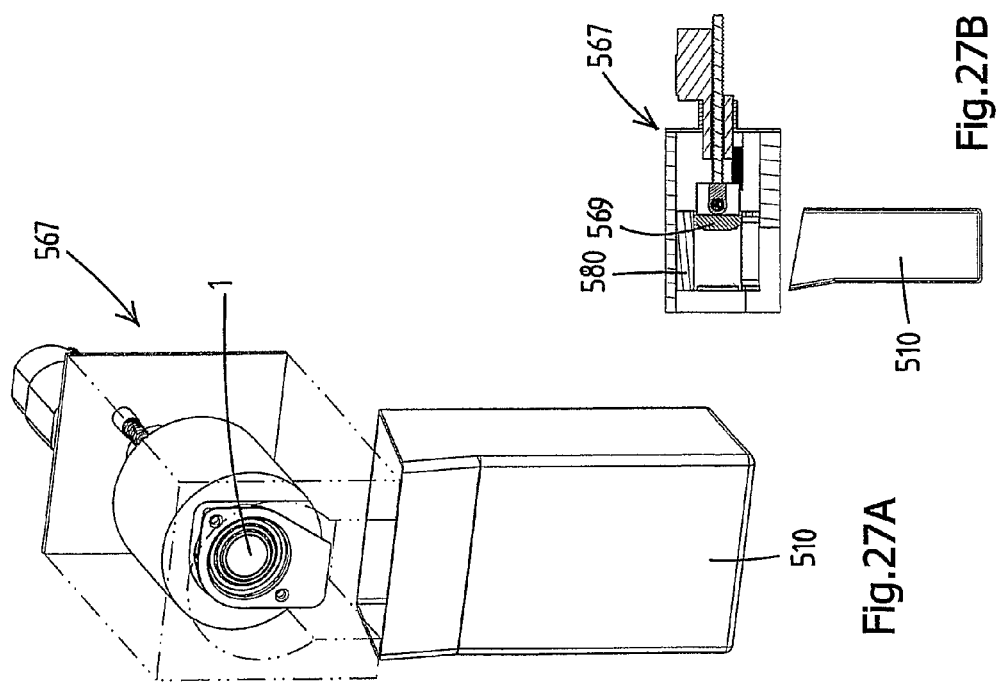
FIGS. 27a and 27b show a perspective view and a cross section respectively of a preferred embodiment of the receiving means in a third state.

After compression of the container 1 the piston 569 is retracted towards the rear position within the compression cylinder 580. Then the rear side of the piston abuts a rear abutment face arranged on the cylinder 580. By retracting the piston 569 further, the cylinder 580 moves along with the piston 569 as is shown in FIGS. 27a and 27b.

Figures 28A, 28B:
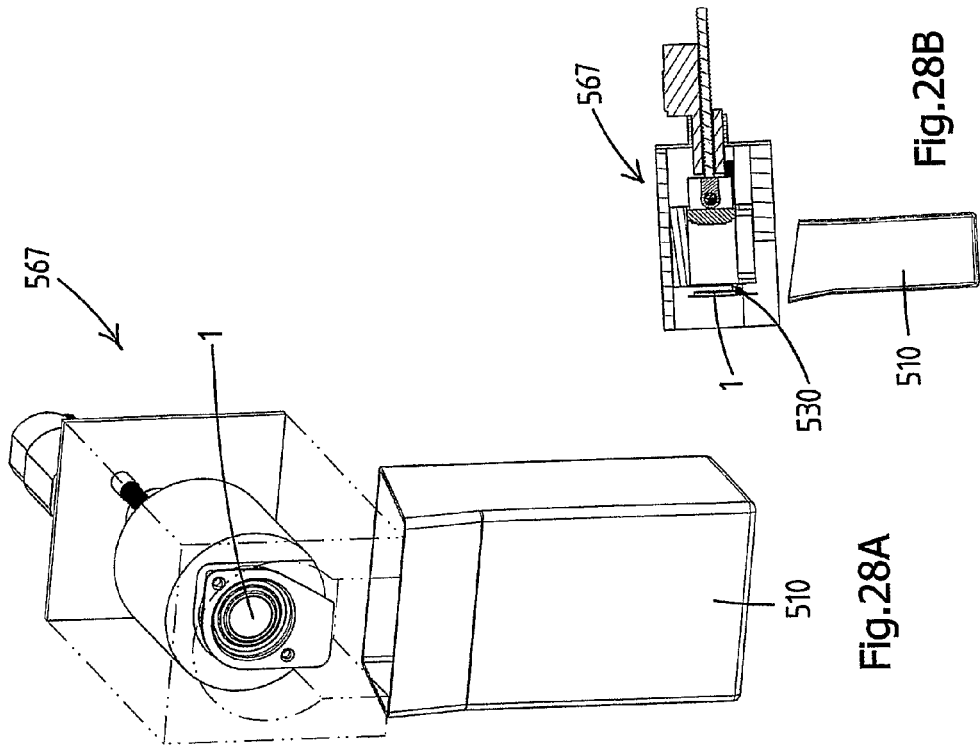
FIGS. 28a and 28b show a perspective view and a cross section respectively of a preferred embodiment of the receiving means in a fourth state.

By moving the piston 569 even further rearwardly the cylinder 580 is moved rearwardly towards a position in which the guiding rods 530, 531 within the guiding bores 540, 541 will abut the positioning projections 601 on the circumferential rim 5 of the container 1. By retracting the piston 569 and the cylinder 580 even further the stationary guiding rods 530, 531 will eject the positioning projections 601 from the guiding bores 540, 541. Thus the container 1 is ejected from the receiving means 567 as is shown in FIGS. 28a and 28b. The guiding rods 530, 531 thus have the function of ejection means. Also, the positioning projections 601 on the container 1 have a function for ejection of the container as is apparent from the above.

The container will fall down through the opening 592 into the receptacle 510 as is shown in FIGS. 29a and 29b. It should be noted that the ejection of the container 1 takes place while the covering lid (not shown) of the receiving means 567 is still closed.

Next, the piston 569 is moved forwardly again. The springs 585 and 586 force the cylinder 580 forwardly (see FIGS. 30a and 30b) towards its front position (see FIGS. 31a and 31b). In the state shown in FIGS. 31a and 31b the receiving means 567 are ready to receive a new filled container 1.

The positioning projections 601 on the circumferential rim 5 (see FIG. 32) can be formed in the rim during the thermo forming process used to manufacture the container 1. This has the advantage that the position of the projections 601 with respect to the cavity and the rest of the container 1 can be formed accurately, such that its proper functioning as positioning means can be assured.

Figure 33:
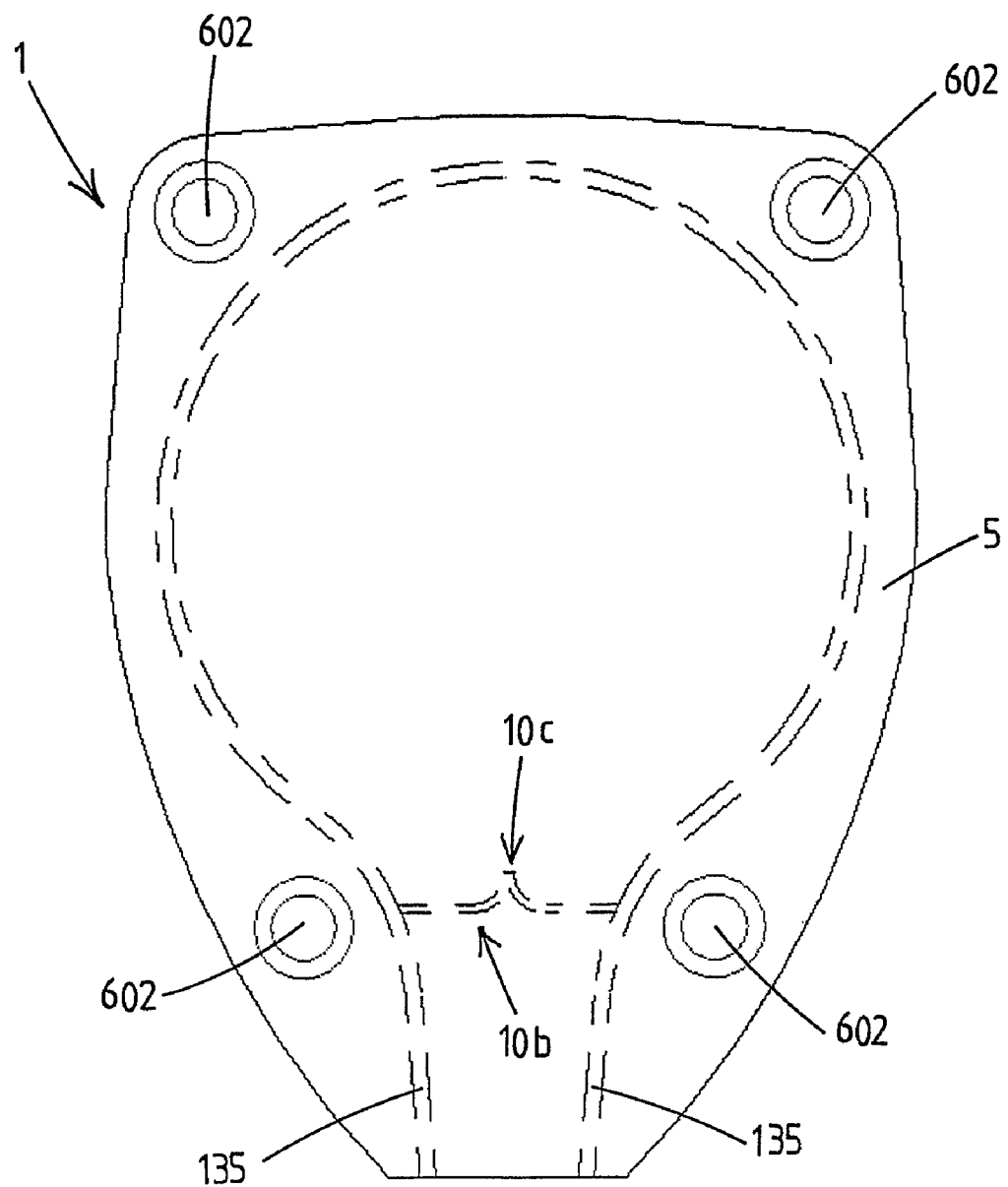
FIG. 33 shows a top view of an alternative embodiment of a container.

The projection 601 can be used to establish whether the container is placed in the receiving means 567. To this end a sensor can be arranged within one or both of the guiding bores 540, 541. As can be seen from the embodiment of the container 1 shown in FIG. 33 the circumferential rim 5 can have more than two, in this specific example four, projections 602. The projections 601 can be used for identifying the container 1, and more specifically the content of the container 1. By providing the receiving means with four guiding bores in which the positioning projections 602 fit preferably tightly and by providing the guiding bores with sensors the projections could be used as identification means. To this end an identification code could be composed by varying the number of projections 602 and the length of the projections, which can be determined by the sensors. The sensors used can be optical sensors, but also any other suitable type of sensor.

Figure 32:
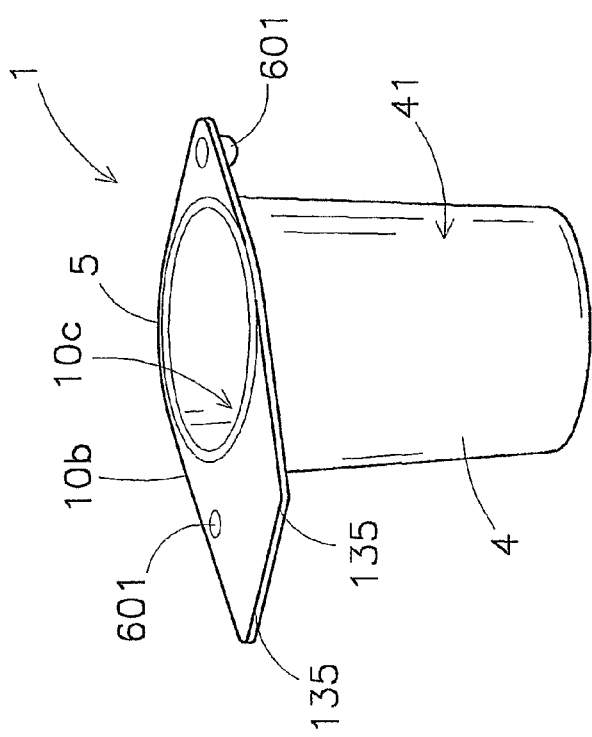
FIG. 32 shows a perspective view of a preferred embodiment of a container that can be used with the receiving means of FIGS. 25-31.
Figure 31B:
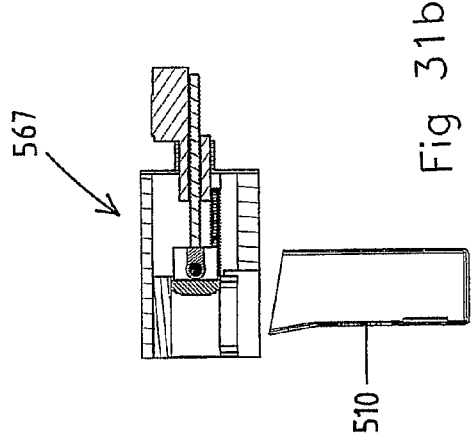
FIGS. 31a and 31b show a perspective view and a cross section respectively of a preferred embodiment of the receiving means in a seventh state.
Figure 31A:
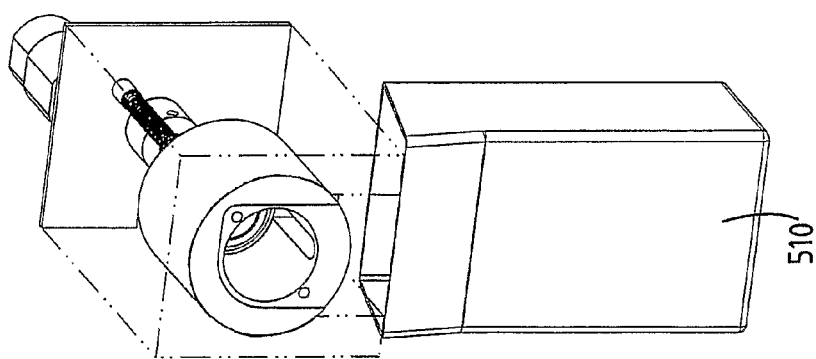

In FIG. 32 can be seen that the container body has a substantially cylindrical side wall 4 with a flat wall portion 41. This flat wall portion 41 can be used to provide a label with a bar code on it, such that the bar code can be read properly from a flat surface by a bar code reader (not shown). The bar code is used as identification means as described hereabove. The bar code can be oriented such that it is read in the axial direction of the container body. The label with the bar code can be applied to the flat portion 41 by a per se known in-mold labeling method.

It is also possible to provide the bar code on the bottom of the container 1. In that case the container 1 does not need to have a flat wall portion 41 as is described above with reference to FIG. 32. The bar code is preferably written on the bottom by a printing device, e.g. a suitable ink jet printer, directly after the container 1 has been filled and the cover sheet has been sealed to it. This has the advantage that information regarding the exact date of filling of the container 1 can be contained in the bar code. Also information about storage life can then be contained in the bar code. It is possible to use this storage life information on the container 1 such that the dispensing apparatus 61 will warn the customer or will even refuse to open the container 1 if the storage life has been exceeded. As a consequence a high quality of the drinks served by the apparatus 61 can be guaranteed.

Figure 45:
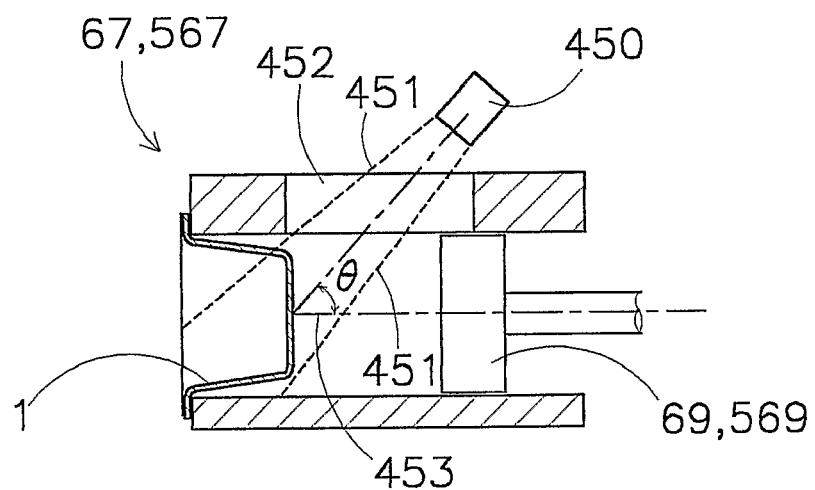
FIG. 45 shows a cross section of an embodiment of the receiving means with a bar code reader.

As can be seen in FIG. 45, when the container with the bar code applied on the bottom is placed into the receiving means 67, 567 of the dispensing apparatus 61 a bar code reader 450 can scan the bar code when the piston 69, 569 is in a retracted position. The bar code reader 450 is placed above the receiving means and can scan through an opening 452 in the wall of the compression chamber 68, 568. The range that can be read by the bar code reader 450 is as an example defined by the dotted lines 451.

During insertion of the container 1 the bar code moves with respect to the bar code reader 450. This makes it possible to use as a bar code reader a simple static laser scan apparatus, which is advantageous compared to more advanced and thus in comparison expensive bar code readers, like e.g. a CCD device or a laser scanner with rotating mirrors. Another advantage of the simple laser scanner is that it can scan the bar code on the bottom of the container 1 from a greater angle than e.g. a CCD device. The laser scanner can scan from a maximum angle $\theta$ of 50° with respect to the perpendicular 453 on the bottom surface of container 1 (see FIG. 45), whereas a CCD device can only scan from a maximum angle $\theta$ of 30° with respect to the mentioned perpendicular. Consequently the use of a simple laser scanner allows for a more compact design of the receiving means 67, 567.

Figure 12:
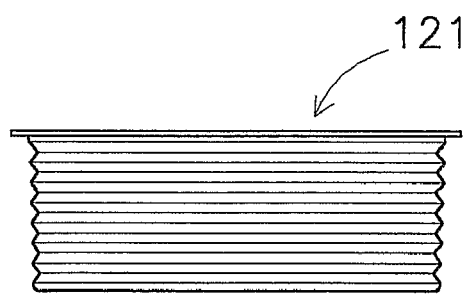
FIG. 12 shows an alternative embodiment of a container.
Figure 13:
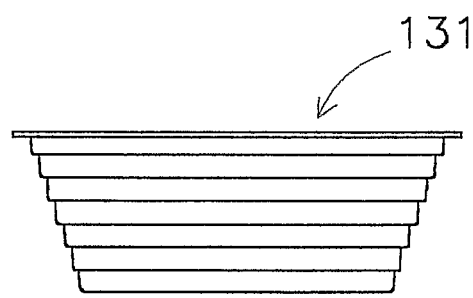
FIG. 13 shows another alternative embodiment of a container.

In the above description the container 1 has a smooth side wall. It is however also possible to have a corrugated side wall as is shown in FIG. 12 or stepped as is shown in FIG. 13. This allows an easier compression of the respective containers 121 and 131.

Another embodiment of a container is shown in FIG. 14a. The container corresponds substantially with the container 1 shown in FIGS. 1-2. Therefore the corresponding elements are designated with the same reference numerals and will not be further described here.

The difference with the container from FIG. 1 is that the extending tab 8 has a dispensing channel 9 formed in it that does not end at the edge of the extending tab 8. The dispensing channel 9 thus has a closed end 9b. The extending tab 8 is provided with a transverse line of rupture 128. The line of rupture 128 crosses the dispensing channel 9b substantially perpendicular. The line of rupture 128 can be formed during production of the container 1 by applying a cross cut 130 at the underside of the extending tab 8. The cross cut 130 is shown in more detail in FIG. 14b. The cut 130 extends partly through the thickness of the tab 8. The covering sheet 7 can be provided with a prescore at the location corresponding to the line of rupture 128.

In use a consumer can separate the end part 8b of the extending tab 8 from the rest by pulling it upwards, as is illustrated in FIG. 14a by the arrows 129. The extending tab 8 will break at the rupture line 128 and the part 8b with the piece of covering sheet applied thereto will be separated which leaves the dispensing channel 9 with an opened end 9a, as is shown in FIG. 14c. The container 1 can then be placed into the dispensing apparatus 67 for further use. The advantage of this container 1 is that the dispensing channel 9 is sealed from the environment until the moment of actual use, whereby the risk of contamination with dirt or the like is eliminated. A hygienic container is thus provided which is well adapted for the use with food products.

Another embodiment of the container is shown in FIG. 15 in a top view. The circumferential rim 5 has a flat extending tab which is covered by the cover sheet. In the figure the cover sheet is not shown, to make the sealing seams visible. The cover sheet is sealed to the extending tab 8 by at two substantially parallel sealing seams 135 which extend outwardly from the circumferential sealing 10 seam to the edge of the extending tab 8. When in use the circumferential seal 10 breaks at the zone 10b and the substance will flow from the filling cavity through the dispensing passage formed by the tab surface and the covering sheet, between the two sealing seams 135 as is indicated by the arrows. At the edge of the extending tab 8 there can be provided an extra seal 136, but this end could also be open, i.e. not sealed to the tab 8, as is shown in FIG. 15a. In an especially advantageous embodiment of the container shown in FIG. 33 the weakened zone 10b has a middle portion 10c pointing in the direction of the cavity of the container as is best shown in FIG. 15b. This has the effect that the seal will break first at the middle portion 10c and then will develop towards the sealing seams 135 where the breaking of the seal will stop.

Figure 15A:
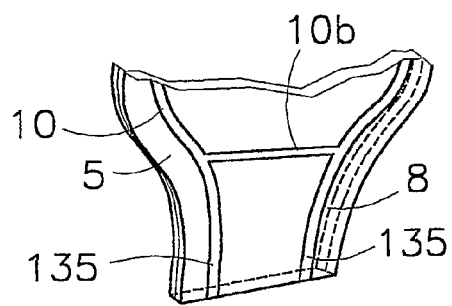
FIG. 15a shows part of the top of another alternative embodiment of a container.
Figure 15B:
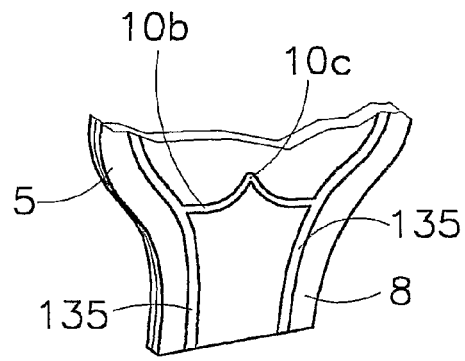
FIG. 15b shows part of the top of still another embodiment of a container.
Figure 15D:
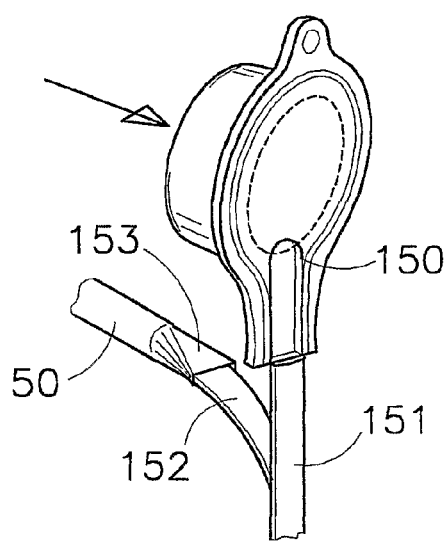
FIG. 15d shows how the container of FIG. 15a or 15b is compressed and its content is mixed with a mixing fluid.

Preferably, the covering lid 80 of the dispensing apparatus has a recess 84a with an elongated form (see FIG. 15c) which is adapted to cooperate with the passage between the seals 135 of the container shown in FIG. 15, FIG. 15a or FIG. 15b. In use the covering sheet of the container of FIGS. 15-15b, which is compressed in an apparatus with a covering lid 80 as is shown in FIG. 15c, will bulge out in the form of a channel 150 as is shown in FIG. 15d. Result of this is that a film jet 151 of substance is expelled from the container. Preferably a film jet 152 of water is expelled from a flat nozzle head 153 that is provided on the central dispensing pipe 50 of the dispensing apparatus. A good mixing of substance and water takes place due to the large contact surface between the water film jet 152 and the substance film jet 151. Another advantage is that a well defined jet of substance is provided without splashing and thus possible contamination of the dispensing apparatus. A further advantage of the thus formed passage 150 between the seals 135 is that if after compression of the container 1 the pressure is relieved, the residue of substance in said passage 150 will be retracted due to an underpressure in the cavity of the container 1, which underpressure also results in sucking the covering sheet of the container 1 onto the rim 8. These effects, which can be characterized by the term "inhaling" effect, result in that after compression of the container 1 no substance is spilled anymore from the container 1, such that no contamination of the dispensing apparatus takes place.

Figure 15E:
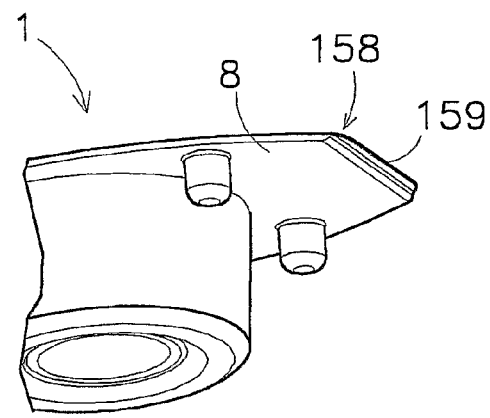
FIG. 15e shows part of a further embodiment of a container.

A substance in general adheres the strongest to a material layer with the greatest thickness. This would cause the flow of substance exiting from the dispensing passage to be bent towards the thickest layer, in this case the tab 8. FIG. 15e shows a still further preferred embodiment of the container 1 of FIG. 15a, 15b, wherein the extending tab 8 has an end part 158 that becomes thinner towards the edge 159 of the tab 8. Preferably the tab 8 at the edge 159 where the dispensing passage ends has substantially the same thickness as the cover sheet. This feature results in that the flow of substance is exiting the dispensing passage straight downwards without being bent off. An advantage is that a well defined and well directed flow of substance is provided without possible contamination of the dispensing apparatus. The end part 158 can be formed to the tab 8 during thermoforming the container 1 in a sheet of plastic material. It is also possible to form the end part 158 whilst punching out waist material between the formed containers 1 in the sheet of plastic material they are formed from as will be described below.

Figure 15F:
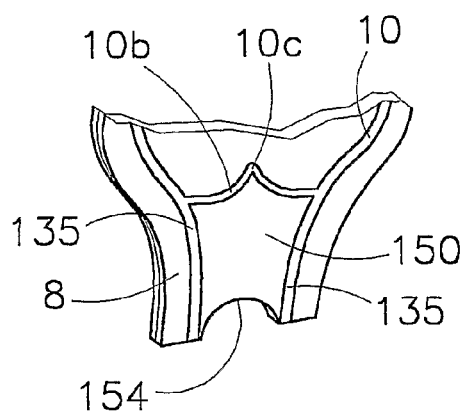
FIG. 15f shows a part of an embodiment of a container with a recessed dispensing part.
Figure 15G:
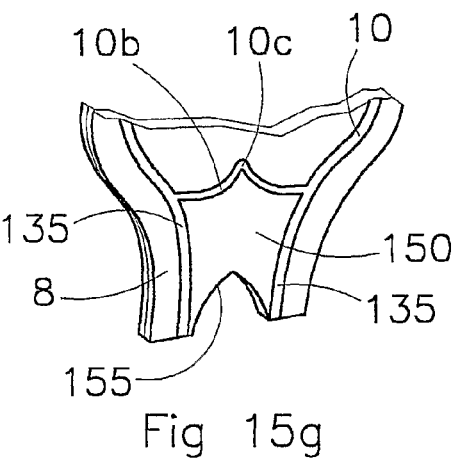
FIG. 15g shows a part of another embodiment of a container with a recessed dispensing part.

In FIG. 15a and FIG. 15b is shown that the dispensing passage ends on a straight edge of the tab 8. It is however also possible that the edge of the extending tab of the rim 5 is provided with a recess and that passage ends at the recess. As is shown in FIG. 15f the recess 154 has a curved form, wherein the curve lies in the plane of the tab 8. In an alternative embodiment the passage ends in a V shaped recess 155 as is shown in FIG. 15g. The recesses 154 and 155 provides for the flow of substance gradually coming off the edge of the extending tab 8. This decreases the total effect of adhesion between the substance and the material of the extending tab 8. This feature results in that the flow of substance is exiting the dispensing passage more straight downwards without being bent off, which advantageously results in a well defined and well directed flow of substance without possible contamination of the dispensing apparatus. A further advantage of the recess 154, 155 is that inwardly formed edge does not easily gets damaged during use, transport or other circumstances. A damaged edge would disturb the flow of substance and would provoke deflection of the flow and thereby contamination of the dispensing apparatus.

In FIG. 37 is shown an embodiment of a container wherein the dispensing channel is provided with an obstruction 370 in this case a dot shaped seal between the cover sheet and the rim upper surface between the seals 135 defining the dispensing channel. In FIG. 38 another embodiment of the container is shown wherein a V-shaped obstruction 380 is provided with the point of the V directed to the cavity. Of course also other shaped obstructions can be provided in the dispensing channel. The obstruction 370, 380 provides for an advantageous influence on the flow of substance within the dispensing channel such that the flow when exiting the channel does not contaminate the dispensing apparatus.

In another embodiment shown in FIG. 39 there are provided one or more weak seals between the seals 135 behind the weakened portion 10b. In the shown embodiment there are provided two weak seals 390 and 391 behind the weak seal 10. During compression of the container first the weakened portion 10b of the circumferential seal 10 breaks and opens up a first part of the dispensing channel. Next the pressure is exerted on the first weak seal 390 in the dispensing channel which will break and open up a second part of the dispensing channel whereby pressure will be exerted on the second weak seal 391. When the second weak seal breaks the dispensing channel is fully open to the outside. The weak seals 390 and 391 provide for a gradually and thus better controlled opening of the container 1. The initial dispensed flow of substance is advantageously better controlled. In a further embodiment the portion 10b is stronger than the first weak seal 390 which in turn is stronger than the second weak seal 391.

Figure 16:
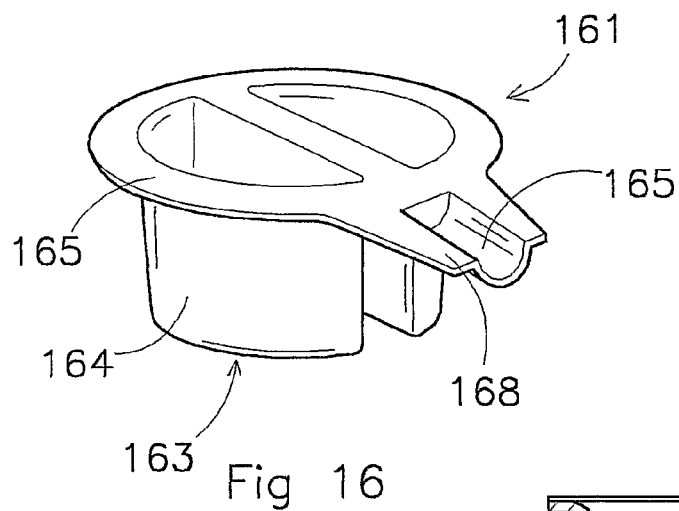
FIG. 16 shows a perspective view of an embodiment of a container with two filling cavities.

FIG. 16 shows still another embodiment of a container. In the figure only the container body is shown. The elements of the container 161 that correspond to the elements of container 1 of FIG. 1 are indicated with the same reference numerals to which 160 is added. These elements will not be described here. The difference with the embodiment from FIG. 1 is that this embodiment has two filling cavities. The two filling cavities can contain different substances which have to be mixed. This can be useful in preparing certain drinks or food products, e.g. yogurt with syrup, coffee with cream but also a non food application where e.g. epoxy has to be prepared is possible.

Figure 17:
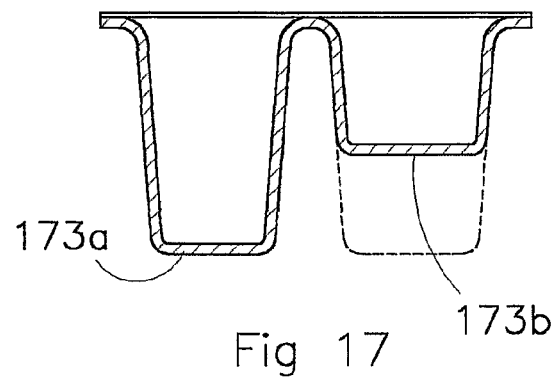
FIG. 17 shows a cross section of a container with two filling cavities with different heights.
Figures 18, 19:
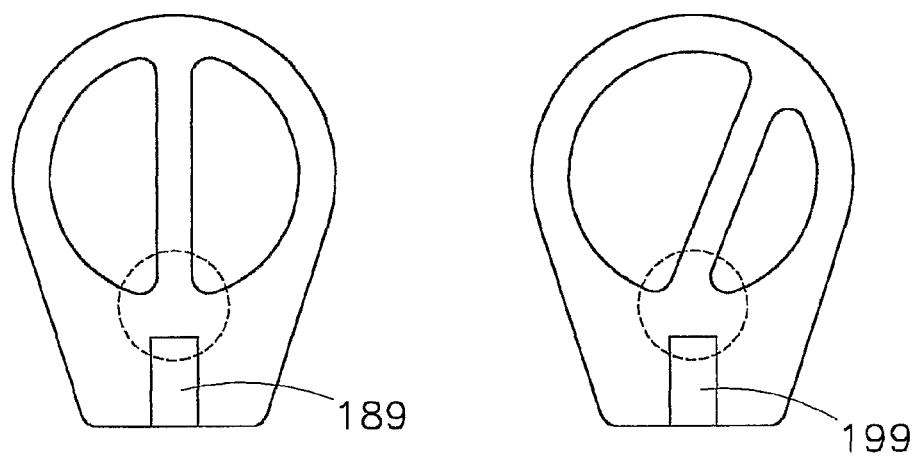
FIG. 18 shows a top view of the container of FIG. 16.
FIG. 19 shows a top view of a container with two filling cavities with each a different cross section.

The filling cavities can have the same volume as is shown in FIG. 16 and FIG. 18, but it is also possible that the filling cavities have a different volume as is shown in FIG. 17 and FIG. 19.

In FIG. 17 a container 170 is shown that has filling cavities with the same cross section, but with a different height. When this container 170 is compressed by a dispensing apparatus 67, the piston will first engage the bottom 173a corresponding to the filling cavity with the largest height and later the bottom 173b of the filling cavity with the smaller height. This is for example practical if yogurt has to be served with syrup or a sauce on top.

In FIG. 19 a container 191 is shown that has filling cavities with different cross sections.

Of course it is also possible to have a container with filling cavities with a different height and with a different cross section.

In all embodiments of FIGS. 16-19 the substances from the two filling cavities are dispensed through one dispensing channel 169, 189, 199.

The containers filled with substance hereabove described are preferably manufactured by a method, wherein the containers are formed from a sheet of plastic material. First a flat sheet of plastic material is placed in a vacuum forming or thermo forming apparatus with a forming die. By vacuum forming the filling cavities into the die, multiple container bodies are formed simultaneously in the sheet. Possibly also dispensing channels 9 of the containers 1 are depressed by the vacuum forming machine in an extension tab, which is subsequently to be formed in the punch machine. The sheet with the filling cavity is placed in a filling machine and filled with substance. Subsequently a sheet 7 of covering foil is sealed over the sheet with the container bodies. Finally, the sheet with the closed containers is placed in a punch machine, where the perimeter of the circumferential rim of the body is formed by punching out waste material between the containers 1.

In the above described manner it is also possible to manufacture two different types of containers simultaneously from one sheet. This is advantageous when two containers are to be used together. A possible application is that one container is like the container 1 already described, whereas the other container contains an additional food product. As an example one can think of a container with substance for soup that is placed in the receiving means 67 of the dispensing apparatus 61, and a second container filled with croutons that have to be added to the soup by the consumer after the apparatus 61 has prepared the soup.

When filling a container 1 with a substance, a certain so called head space is necessary above the final level of the substance in the container 1. The head space is the distance between the final substance level after filling and the cover on the upper side of the container 1. The head space secures that the filling machine will not spill too much substance, e.g. by splashing. It has already been mentioned that for different portions of a certain drink (e.g. one glass or a whole bottle of a soft drink) containers 1 with differently sized bodies with equally concentrated substance can be inserted in the dispensing apparatus according to the invention. The containers described above preferably have a body with a diameter of substantially 40 mm. For containers with a smaller volume of substance it is, instead of using a container body with a decreased length and an equal diameter of about 40 mm, more favourable to use a container body with a smaller diameter e.g. 20 or 30 mm and a greater length, such that enough head space can remain above the final substance level in the container 1. The circumferential rim of course remains with the same outer form and dimensions, such that the container with the body with the smaller diameter can be placed in the receiving means of the dispensing apparatus without any problem just like the larger body container 1.

The container can have a cover which is not a flat sheet of e.g. foil material, but which is preformed. In FIG. 40 a cover 400 is shown which is preformed such that a covering surface 403 is positioned within the cavity. In FIG. 40 is shown that the covering surface 403 lies countersunk within the cavity of the container 1. The cover 400 further has a planar circumferential rim 401 which contacts the circumferential rim 5 of the container 1 and is sealed to it. Because of the countersunk cover surface 403, the head space between the fluid level 402 of the substance in the container 1 and the layer 400 is reduced. The smaller head space above the fluid level means a reduced volume of air above the substance, which is advantageous in view of the storage life of the substance contained within the container 1.

In FIG. 41 is shown a container as in FIG. 40 with a cover lid 80 (see FIG. 8) of the dispensing apparatus positioned over it. The covering lid 80 is shaped such that it complementary with the countersunk form of the cover 400 of the container. The covering lid 80 has a recess 84 for allowing the cover 400 of the container 1 to bulge out upon pressurization of the content of it.

The container can also have a preformed cover with a covering surface which is situated above the rim 5 of the container 1. In FIG. 42 an example is shown, wherein the cover is designated with reference numeral 420. The cover 420 has a covering surface 421 that extends in a plane above the plane of the rim 5 of the container 1. The cover 420 has a rim 422 which is complementary to the rim 5 of the container and attached to it with a sealing seam.

Figure 43:
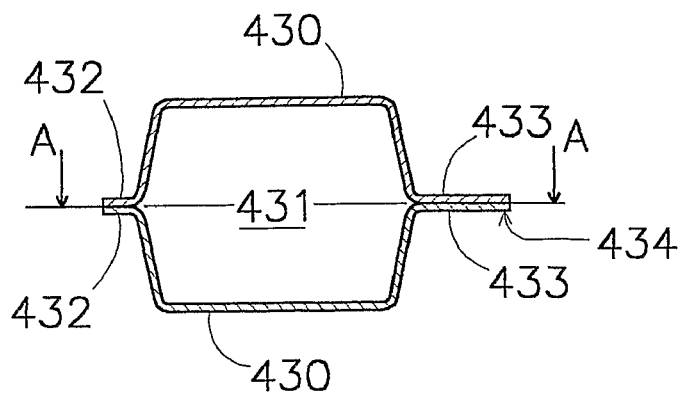
FIG. 43 shows a cross sectional view of still another alternative embodiment of a container according to the invention comprising two preformed shells.
Figure 44:
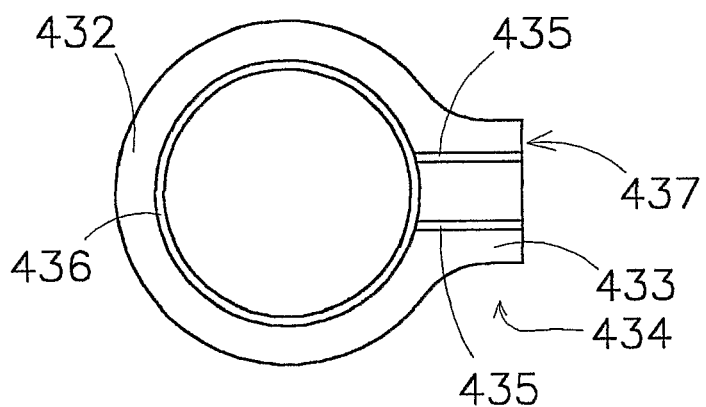
FIG. 44 shows a sectional view along the line A-A in FIG. 43.

In a further preferred embodiment shown in FIG. 43 and FIG. 44 the container body and the cover are substantially equally shaped and manufactured of the same material. Such a container 1 has a body which comprises two preformed shells 430. In the terminology of the containers described above one of the shells 430 would form the body, whereas the other shell 430 would form the cover. The shells are preferably made of plastic material, more preferably of polyethylene, and are manufactured by a thermoforming process. The shells 430 each define a part of a filling cavity 431 for containing substance. The shells 430 each have a circumferential rim 432. The circumferential rims 432 of the respective shells 430 are attached to each other by means of a circumferential sealing seam 436. The sealed together circumferential rims 432 at a portion of the circumference form a dispensing part 434. In a possible embodiment which is shown in FIG. 43 and FIG. 44, the circumferential rims 432 of the shells 430 at a portion of the circumference each have a dispensing part half 433, wherein the dispensing part halves 433 are sealed together so as to form the dispensing part 434 of the container. The dispensing part halves 433 are sealed together by at least two outwardly directed sealing seams 435 which extend at a distance from one another from the circumferential sealing seam 436 to the edge 437 of the dispensing part 435. This embodiment can be shaped in analogy with the dispensing part of the container 1 shown in FIG. 15a-15g. In another embodiment the dispensing part 433 is provided with a preformed dispensing channel, which is closed off from the filling cavity by a sealing seam in analogy with the embodiment of the extending tab 8 of the container 1 shown in FIG. 2.

In the above description the use for dispensing food products is mentioned. The container can be filled with concentrate for coffee, tea, chocolate, soup, dairy products like milk or yogurt drinks, fruit and vegetable juices, soft drinks and sport drinks.

The use of dispensing a substance from a container in the manner, as is described hereabove is however not only delimited to applications with food products. It is also possible to use this principle in non-food applications, e.g. in medical applications for dispensing a dose of a medicament.

The dispensing apparatus has to be cleaned after a certain period of time. To this end a cleaning fluid can be lead through the dispensing apparatus. For instance it is possible that on the dispensing apparatus 61 of FIG. 7 instead of a water tank 63 a tank or other container with a cleaning fluid is placed. In order to let the cleaning fluid flow through the apparatus 61 a dummy container with the shape of a container 1 can be placed in the receiving means 67. The dummy container can be provided with a bar code or other identification means which can be read by the sensor 79. The control system 75 then runs a cleaning program whereby the flow of cleaning fluid is lead through the fluid lines 74a, 74b and 66. The body of the dummy container can have such a short length that it will not be compressed by the compression means. In another possible embodiment the dummy container might be filled with a check fluid which colors the resulting mix if there is still cleaning fluid dispensed by the apparatus. Compression of the dummy container dispenses the check fluid.

What is claimed is:

1. A kit, in combination, comprising:
a container filled with a single portion of a substance, comprising a preformed deformable body defining a filling cavity, which preformed body is generally cup-shaped with a bottom, a sidewall extending from said bottom and opposite said bottom an opening, wherein said body has a planar circumferential rim surrounding said opening, which circumferential rim is integral with the side wall and extends outwardly therefrom, and wherein said opening is closed by a cover sheet which is sealed to the circumferential rim by means of a circumferential sealing seam, said circumferential sealing seam comprising a weakened zone at a predetermined location, wherein the container is provided with identification means corresponding to the substance contained in the container so as to allow automatic identification of the container, and a dispensing apparatus comprising receiving means for receiving the container, the apparatus furthermore comprising compression means for compressing the container body received in the receiving means, whereby, in use, the substance in the container is pressurized and the sealing seam between the cover sheet and the circumferential rim is broken at the location of the weakened zone such that a dispensing passage between the cover sheet and the circumferential rim of the container is provided for dispensing the substance from the container and the apparatus furthermore comprising identification recognition means for automatically identifying the container and the substance therein.

2. Kit according to claim 1, wherein the receiving means of the dispensing apparatus have a compression chamber with a variable volume for receiving the container body, a stop face engaging the back side of the circumferential rim and a covering lid with a supporting face for engaging the cover sheet of the container.

3. Kit according to claim 2, wherein the covering lid is provided with a recess arranged such that when the covering lid is closed it is positioned over a part of the sealing seam, so as to allow the cover of the container to bulge out into the recess upon compression of the container body and the sealing seam to break.

4. Kit according to claim 1, wherein the receiving means is adapted to receive containers with different body sizes.

5. Kit according to claim 1, wherein the receiving means is adapted to hold the circumferential rim of the container during dispensing of the substance.

6. Kit according to claim 1, wherein the receiving means are provided with ejection means for ejecting a container from the receiving means.

7. Kit according to claim 5, wherein the ejection means comprise one or more ejection rods, the ejection rods being movable with respect to the stop face towards a position wherein they project with respect to the stop face and engage the circumferential rim of the container.

8. Kit according to claim 7, wherein the ejection rods are stationary and the stop face is movable with respect to the ejection rods between a front position near the covering lid and a rear position distant from the covering lid.

9. Kit according to claim 1, wherein the compression chamber is provided with a piston coupled to drive means, which piston is adapted to engage the container body.

10. Kit according to claim 9, wherein the drive means comprise a screw spindle and an electric motor.

11. Kit according to claim 9, wherein the drive means comprise pneumatic means.

12. Kit according to claim 9, wherein the drive means comprise hydraulic means.

13. Kit according to claim 9, wherein the drive means are adapted to be hand driven.

14. Kit according to claim 1, wherein the dispensing apparatus comprises treatment means for treating the substance dispensed from the container.

15. Kit according to claim 14, wherein the treatment means comprise liquid dispensing means for a liquid to be mixed with the substance from the container.

16. Kit according to claim 15, wherein the liquid dispensing means for liquid comprise means for dispensing cooled water and/or hot water and/or water with ambient temperature.

17. Kit according to claim 15, wherein the dispensing means for liquid comprise means for dispensing carbonated water.

18. Kit according to claim 17, wherein the means for dispensing carbonated water comprise in combination a connecting arrangement for connecting a $CO_2$ bottle to the dispensing apparatus and a $CO_2$ bottle.

19. Kit according to claim 18, wherein the $CO_2$ bottle is provided with a closing valve and the connecting arrangement is provided with connecting means for opening the closing valve.

20. Kit according to claim 19, wherein the closing valve has a valve housing with a circumferential flange and the connecting means has engagement means for engaging said flange such that in a connected state a rotation of the valve housing with respect to the connecting means is prevented.

21. Kit according to claim 1, wherein the dispensing apparatus has dispensing means for different sorts of water, e.g. hot water, cooled water and carbonated water, which are positioned such that the different sorts of water can be dispensed at one point in a serving container like e.g. a cup or a bottle.

22. Kit according to claim 1, wherein the identification means are applied to the cover sheet of the container.

23. Kit according to claim 1, wherein the identification means are applied to the preformed deformable body.

24. Kit according to claim 23, wherein the identification means are visual identification means, for example a bar code.

25. Kit according to claim 23, wherein the identification means comprise electronic identification means.

26. Kit according to claim 25, wherein the electronic identification means comprise a resonance circuit.

27. Kit according to claim 25, wherein the electronic identification means comprise a transponder.

28. Kit according to claim 1, wherein the identification recognition means comprise optical scanning means which are arranged in the receiving means of the dispensing apparatus such that the bottom surface of a container can be scanned.

29. Kit according to claim 28, wherein the optical scanning means comprise a laser scanner.

30. Kit according to claim 1, wherein the cover sheet is made of foil material.

31. Kit according to claim 1, wherein the cover sheet comprises a multilayer material.

32. A kit, in combination, comprising:
a container filled with a single portion of a substance, comprising a preformed deformable body defining a filling cavity which body has an opening and an integral planar circumferential rim surrounding said opening, which opening is closed by a cover sheet which is sealed to the circumferential rim by means of a circumferential sealing seam, wherein the container is provided with identification means corresponding to the substance contained in the container so as to allow automatic identification of the container, and
a dispensing apparatus comprising receiving means for receiving the container, which apparatus is adapted to open the container and comprises identification recognition means for automatically identifying the container and the substance therein,
wherein the receiving means of the dispensing apparatus have a compression chamber with a variable volume for receiving the container body, a stop face engaging the back side of the circumferential rim and a covering lid with a supporting face for engaging the cover sheet of the container, which covering lid is provided with a recess arranged such that when the covering lid is closed it is positioned over a part of the sealing seam, so as to allow the cover sheet of the container to bulge out locally into the recess in the covering lid upon compression of the container body and the sealing seam to break at the location of the recess in the covering lid whereby a dispensing passage for the substance is provided between the cover sheet and the circumferential rim.

33. A kit, in combination, comprising:
a container filled with a single portion of a beverage preparation concentrate, comprising a preformed deformable body defining a filling cavity, which preformed body is generally cup-shaped with a bottom, a sidewall extending from said bottom and opposite said bottom an opening, wherein said body has a planar circumferential rim surrounding said opening, which circumferential rim is integral with the side wall and extends outwardly therefrom, and wherein said opening is closed by a cover sheet which is sealed to the circumferential rim by means of a circumferential sealing seam, said circumferential sealing seam comprising a weakened zone at a predetermined location, wherein the container is provided with identification means corresponding to the beverage preparation concentrate contained in the container so as to allow automatic identification of the container, and
a beverage dispensing apparatus comprising receiving means for receiving the container, the apparatus furthermore comprising compression means for compressing the container body received in the receiving means, whereby, in use, the beverage preparation concentrate in the container is pressurized and the sealing seam between the cover sheet and the circumferential rim is broken at the location of the weakened zone such that a dispensing passage between the cover sheet and the circumferential rim of the container is provided for dispensing the concentrate from the container into a mixing container, the apparatus furthermore comprising water dispensing means for dispensing water into said mixing container to mix it with the concentrate dispensed from the container and the apparatus furthermore comprising identification recognition means for automatically identifying the container and the substance therein.

* * * * *